US010007953B1

(12) United States Patent
Nathoo et al.

(10) Patent No.: US 10,007,953 B1
(45) Date of Patent: Jun. 26, 2018

(54) FUND WITHHOLDING FOR PAYROLL PAYMENTS

(71) Applicant: Square, Inc., San Francisco, CA (US)

(72) Inventors: Amir Nathoo, San Francisco, CA (US); James Colin Brady, San Francisco, CA (US); Anish Bhatt, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days. days.

(21) Appl. No.: 14/334,455

(22) Filed: Jul. 17, 2014

(51) Int. Cl.
*G07F 19/00* (2006.01)
*G06Q 40/00* (2012.01)
*G06Q 20/10* (2012.01)

(52) U.S. Cl.
CPC ........... *G06Q 40/125* (2013.12); *G06Q 20/10* (2013.01)

(58) Field of Classification Search
CPC ..... G06Q 20/10; G06Q 20/204; G06Q 40/125
See application file for complete search history.

(56) References Cited

U.S. PATENT DOCUMENTS

| 6,347,306 | B1 | 2/2002 | Swart | |
|---|---|---|---|---|
| 6,401,079 | B1 | 6/2002 | Kahn et al. | |
| 6,411,938 | B1 | 6/2002 | Gates et al. | |
| 7,398,238 | B1 * | 7/2008 | Calce | G06Q 40/02 705/35 |
| 8,099,359 | B1 * | 1/2012 | Coyle | G06Q 20/10 235/379 |
| 9,418,387 | B1 | 8/2016 | Aaron et al. | |
| 2001/0034676 | A1 | 10/2001 | Vasic | |
| 2002/0069144 | A1 | 6/2002 | Palardy | |
| 2002/0138424 | A1 * | 9/2002 | Coyle | G06Q 20/02 705/39 |
| 2003/0197055 | A1 * | 10/2003 | Ben-Aissa | G06Q 20/341 235/379 |
| 2003/0222135 | A1 * | 12/2003 | Stoutenburg | G06Q 20/04 235/379 |
| 2004/0019542 | A1 | 1/2004 | Fuchs et al. | |
| 2005/0177496 | A1 * | 8/2005 | Blagg | G06Q 20/10 705/39 |

(Continued)

OTHER PUBLICATIONS

Non-Final Office Action dated Nov. 6, 2015, for U.S. Appl. No. 14/334,507, of Nathoo, A., et al., filed Jul. 17, 2014.

(Continued)

*Primary Examiner* — Talia F Crawley
(74) *Attorney, Agent, or Firm* — Lee & Hayes, PLLC

(57) ABSTRACT

In some examples, a service provider may provide a payroll service and a payment processing service to businesses. For instance, with authorization from the employer, the service provider may withhold a percentage of funds received as sales revenue through the payment service. For example, the service provider may withhold a percentage of sales revenue each day to be used to pay at least a portion of the payroll payments paid to employees of the employer. Alternatively, the service provider may determine an amount of payroll payments currently due to be paid on a given day, and may deduct at least a portion of this amount from the sales revenue of the employer for that day. As another alternative, the service provider may make payroll payments in advance, and may withhold a percentage of the employer's daily sales revenue until the cash advance is paid back.

20 Claims, 10 Drawing Sheets

(56) References Cited

U.S. PATENT DOCUMENTS

| | | | |
|---|---|---|---|
| 2008/0065396 A1* | 3/2008 | Marshall | G06Q 10/10 705/16 |
| 2008/0149707 A1* | 6/2008 | Urcuyo | G06Q 40/02 235/379 |
| 2009/0192926 A1 | 7/2009 | Tarapata | |
| 2010/0019028 A1* | 1/2010 | Books | G06Q 20/04 235/379 |
| 2011/0082778 A1 | 4/2011 | Dombroski et al. | |
| 2012/0209754 A1 | 8/2012 | Sivasubramaniam | |
| 2013/0041810 A1 | 2/2013 | Murrell et al. | |
| 2014/0129398 A1 | 5/2014 | Naik et al. | |

OTHER PUBLICATIONS

Non-Final Office Action dated Aug. 26, 2014, for U.S. Appl. No. 14/106,439, of Aaron, P., et al., filed Dec. 13, 2013.

Final Office Action dated Mar. 4, 2015, for U.S. Appl. No. 14/106,439, of Aaron, P., et al., filed Dec. 13, 2013.

Advisory Action dated Jun. 4, 2015 for U.S. App. No. 14/106,439, of Aaron, P., et al., filed Dec. 13, 2013.

Non-Final Office Action dated Sep. 11, 2015, for U.S. Appl. No. 14/106,439, of Aaron, P., et al., filed Dec. 13, 2013.

Notice of Allowance dated Mar. 28, 2016, for U.S Appl. No. 14/106,439, of Aaron, P., et al., filed Dec. 13, 2013.

Final Office Action dated Apr. 5, 2016, for U.S. App. No. 14/334,507, of Nathoo, A., et al., filed Jul. 17, 2014.

Non-Final Office Action dated Jan. 20, 2017, for U.S. App. No. 14/334,488, of Nathoo, A., et al., filed Jul. 17, 2014.

Non-Final Office Action dated Jan. 20, 2017, for U.S. App. No. 14/334,507, of Nathoo, A., et al., filed Jul. 17, 2014.

U.S. App. No. 14/334,488, of Nathoo, A., et al., filed Jul. 17, 2014.

U.S. App. No. 14/334,507, of Nathoo, A., et al., filed Jul. 17, 2014.

Non-Final Office Action dated Jan. 9, 2015 for U.S. App. No. 14/334,507, of Nathoo, A., et al., filed Jul. 17, 2014.

Final Office Action dated Jun. 9, 2017, for U.S. App. No. 14/334,488, of Nathoo, A., et al., filed Jul. 17, 2014.

Final Office Action dated Aug. 17, 2017, for U.S. App. No. 14/334,507, of Nathoo, A., et al., filed Jul. 17, 2014.

Final Office Action dated Jul. 10, 2015, for U.S. Appl. No. 14/334,507, of Nathoo, A., et al., filed Jul. 17, 2014.

\* cited by examiner

FUND WITHHOLDING FOR PAYROLL PAYMENTS

BACKGROUND

Employees of many businesses are typically paid on a weekly, biweekly or monthly basis. For example, a business may hire a payroll service that determines the amount of compensation due to each employee, such as based on the number of hours worked, a salary, taxes to be withheld, and so forth. A total amount to be paid out for the payroll may then be transferred from the bank of the business to the bank of the payroll service to be used to make payroll payments. When the money has been received at the bank of the payroll service, the payroll service pays the employees, such as by check or direct deposit, often a week or more after when the work was actually performed by the employees.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
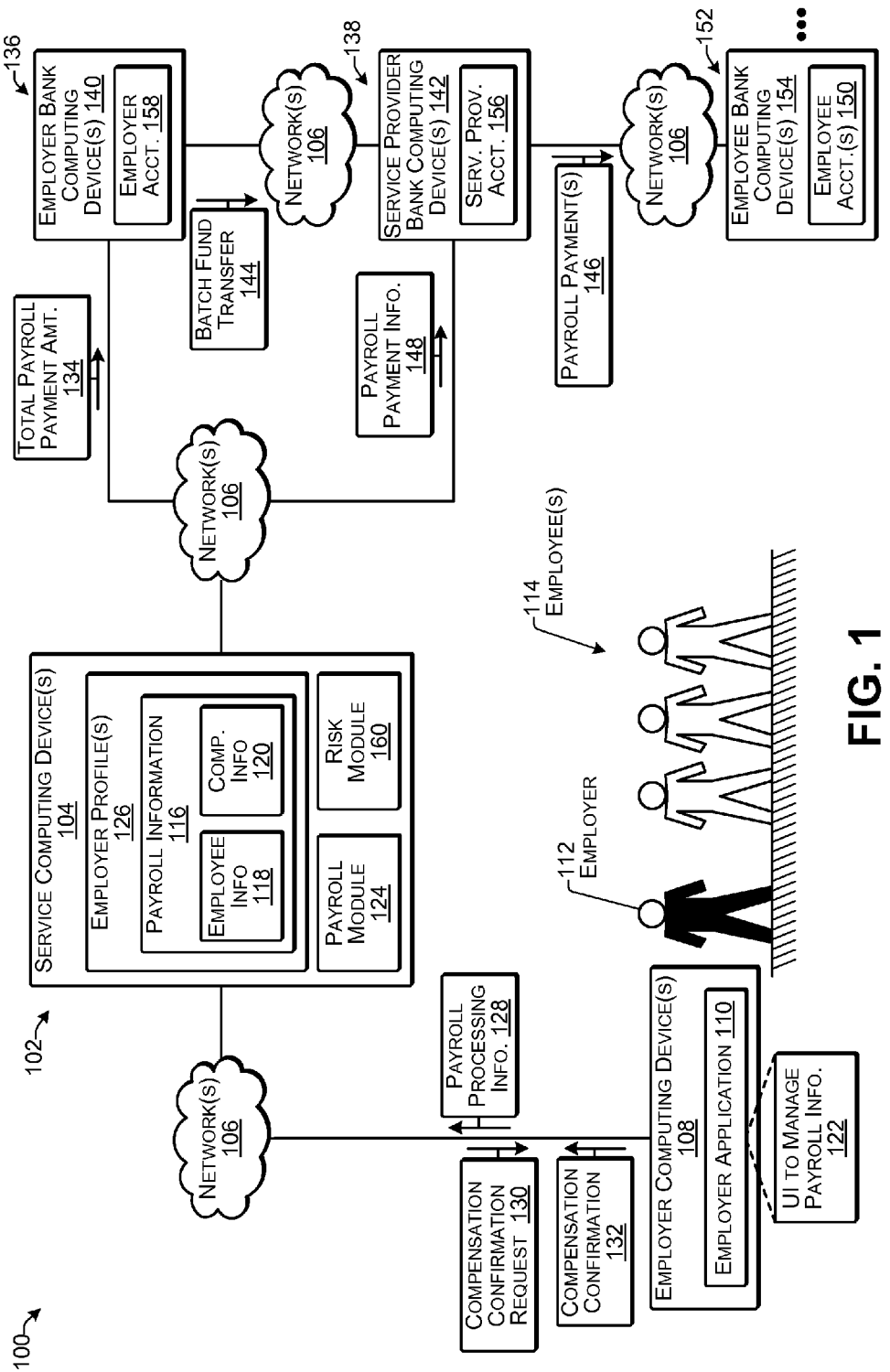
FIG. 1 illustrates an example environment for a payroll service according to some implementations.

Some implementations herein include techniques and arrangements that enable a payroll service to make payroll payments to employees on behalf of an employer. In some instances, the payroll service may pay the employees without waiting to receive a transfer of funds from the employer's bank. As one example, the payroll service may use near-real-time fund transfers for making payments to the employees, but may receive payments for the payroll from the employer's bank using batch-processed fund transfers. In some cases, a payroll service provider may determine whether to pay the employees using the near real-time payments based on a risk analysis of the employer's financial position and/or other considerations, such as the amount to be paid out. For instance, the payroll service may be affiliated with a payment service that processes transaction payments for the business of the employer, and the payroll service may determine the risk based at least in part on information available through the payment service.

Additionally, or alternatively, through the payment service, the payroll service may withhold a percentage of the transaction revenue from the employer's business to be used for making payroll payments. Accordingly, any risk assumed by the payroll service in making the near real-time payroll payments to the employees may be reduced or eliminated by the ability to apply the withheld funds to the payroll payments. As another alternative, in the case that one or more near real-time payroll payments have already been made, the payment service may recover at least a portion of the payroll payments by taking a percentage of the daily sales revenue of the employer's business. As still another alternative, the payroll service may determine the payroll payments to be made on a particular day, and may withhold at least a portion of the amount to be paid out for payroll from that day's sales revenue.

Further, the payroll service may be configured to pay employees on the same day as on which the work is performed. For instance, the payroll service may receive an indication of time worked by an employee, commission earned by the employee, gratuities received by the employee, etc., such as from information available through the payment service. In response, the payroll service may use a near real-time payment technique to send a payroll payment to an account associated with the employee as payment for the time worked and other money earned that day. For instance, the payroll service may perform a risk assessment to determine that there is a low risk associated with sending the payroll payment to the employee prior to receiving funding from the employer's bank. Alternatively, if the payroll service has been permitted by the employer to withhold a portion of the employer's sales revenue in advance, the payroll service may use a portion of this withheld money to pay the employee. In addition, the payroll service and the employer may allow the employees to specify how frequently the employees are to receive payroll payments, e.g., hourly, semi-daily, daily, weekly, bi-weekly, monthly, etc. For instance, individual employees or the employer may be able to indicate to the payroll service, such as via a user interface presented on a computing device, a desired payroll payment frequency for the individual employees.

As mentioned above, in some examples, the payroll service provider may also provide a payment service to the business of the employer to enable payment processing for point of sale (POS) transactions. For instance, the employer may be a merchant, and the service provider that provides the payroll service may also provide the payment service to the merchant/employer. The payment service may include the provision of payment processing software, payment processing hardware and/or payment processing services to the merchant to enable the merchant to receive payments from buyers when conducting POS transactions with buyers. For instance, the payment service may enable the merchant/ employer to receive cash payments, payment card payments, and/or electronic payments from buyers for POS transactions.

In addition, the data from the payment service may be used by the payroll service to determine payroll payments that are due to be paid to particular employees of the merchant. For example, the payment service may receive data that includes time worked by an employee, sales made by the employee, gratuities received by the employee, and so forth. The payroll service may directly receive the data from the payment service to calculate the payroll payment due to be paid to the particular employee without any manual action or input from the employer. For example, the payroll service may use the data from the payment service to determine whether the employee is due to be paid a sales commission based on the amount of sales made while the employee is logged in to, or otherwise determined to be using a particular merchant POS device on which identified sales are generated. Further, gratuities may be tracked and distributed according to one or more gratuity distribution rules provided by the merchant/employer. Accordingly, same-day payroll payments may be made to the employees, and the payments may include commissions and/or gratuities due to be paid to the employees based on the work performed by the employees on that same day.

Additionally, in some examples, the service provider may withhold money from the sales revenue of the employer for use in making payroll payments. The payroll service may use the withheld funds for paying the employees using near real-time payments, rather than batch-processed payments. For instance, the payroll service provider may also provide the payment service that enables the business of the employer to perform POS transactions with buyers for the sale of items. With the employer's authorization, the payment service may withhold a percentage of funds from the payment receipts from these transactions in advance for subsequent use in paying the employer's payroll. Alternatively, the service provider may, with the employer's authorization, take a portion of the sales revenue as repayment for payroll payments already made or for payroll payments that have been determined, but not yet paid to the employees. Accordingly, rather than waiting for a batch fund transfer from the employer's bank, the payroll service may have immediate access to funds of the employer, which can enable the payroll service to pay the employees for same-day work, such as using near real-time money transfer techniques, and without assuming a risk (or with a reduced risk) of not being paid by the employer.

For discussion purposes, some example implementations are described in the environment of a service computing device that provides a payroll service and a payment service to an employer, such as for enabling payroll payments that are more frequent or more convenient than with conventional payroll services. However, implementations herein are not limited to the particular examples provided, and may be extended to other environments, other system architectures, other applications, and so forth, as will be apparent to those of skill in the art in light of the disclosure herein. For instance, while some examples are described in an environment of transferring money to a bank account of an employee via several near real-time techniques, rather than moving money by batch transfer processing, which can take 3-5 business days, other techniques for moving money in near real time may alternatively be used in some environments.

FIG. 1 illustrates an example environment 100 for a payroll service according to some implementations. The environment 100 may enable a service provider 102 to provide a payroll service that makes payroll payments to employees on behalf of an employer. For example, one or more service computing devices 104 may be associated with the service provider 102, and may be able to communicate over one or more networks 106 with one or more employer computing devices 108. For example, the service computing device 104 may communicate with an employer application 110 configured to execute on the employer computing device 108. Further, the employer computing device 108 may be associated with a particular employer 112.

The employer 112 may have a business that employs one or more employees 114. As used herein, an employee 114 may include any individual hired by an employer 112 to perform work in exchange for payroll payments, and may include an individual employed by the employer 112 in the past, an individual presently employed by the employer 112, or an individual to be employed by the employer 112 in the future. Further, in some examples, an employee 114 may include an independent contractor or agent that receives payroll payments from the employer 112. In addition, an employer 112 may be any entity that hires employees 114 to perform work and pays the employees 114 according to payroll information 116.

The payroll information 116 may include employee information 118 and compensation information 120. The employee information 118 may include a list of one or more employees of the employer, including employee names or other employee identifiers. The employee information 118 may further include tax information, such as a taxpayer identification number (e.g., Social Security Number (SSN)) for each employee, tax withholding information for federal and state taxes, residence information, bank account information, desired payroll payment frequencies according to which individual employees are to be paid, and so forth.

The compensation information 120 may include an indication of an amount that each employee is to be paid, including wages, salary, bonuses, commission, tips or other gratuities, garnishments, and the like. For example, the compensation information 120 may include whether a particular employee is paid by the hour or by a salary, how much the employee is to be paid, whether the employee is eligible for overtime, whether the employee is eligible for a commission or bonus, whether the employee receives gratuity income, and so forth. Furthermore, the compensation information 120 may include one or more employer-established rules for making payments to the employees, such as conditions under which commissions or bonuses may be paid, rules for distributing gratuity income, and so forth.

In some examples, the employer application 110 may present a user interface (UI) 122 to enable the employer to, among other things, manage the payroll information 116, including the employee information 118 and the compensation information 120. In some examples, the employer application 110 may be a web browser, or the like, that enables the employer 112 to access and manage the payroll information 116 via one or more webpages. In other examples, the employer application 110 may be an application, such as a mobile application or desktop application, which is provided by the service provider 102, or which may be an otherwise dedicated application. Further, in some cases, the employer application 110 may also function as, or may be able to operate concurrently with, a merchant application (not shown in FIG. 1) to enable the employer 112 and/or employees 114 to conduct POS transactions, such as for the sale of goods and/or services (goods and/or services are referred to hereinafter as "items").

The service computing device 104 may include a payroll module 124 that is able to receive employer information from the employer 112, including the payroll information 116 and the compensation information 120. The payroll module 124 may save the employer information in respective employer profiles 126, such that each employer profile 126 may be associated with a respective employer 112. In addition, the payroll module 124 may determine, based at least in part on the payroll information 116 and payroll processing information 128 received from, e.g., the employer computing device 108, amounts of payroll payments due to be paid to each employee, amounts of taxes to withhold for each employee, when to make a payroll payment to each employee, how to make the payroll payments to each employee (check, direct deposit, etc.), and so forth. For example, the payroll processing information 128 received by the payroll module 124 may include an amount of time worked by individual employees over a most recent pay period (e.g., in the case that the employees work for an hourly wage), sales totals for individual employees (e.g., in the case that the employees work for sales commissions), gratuity information for individual employees (e.g., in the case that the employees receive gratuities), etc.

In some examples, the payroll processing information 128 may be provided by the employer 112 from the employer computing device 108. As another example, the payroll processing information 128 may be provided automatically by a merchant POS computing device, as discussed additionally below with respect to FIG. 2. For instance, the payroll processing information may be derived from transaction information and/or time card information received from a merchant POS device, as discussed below with respect to FIG. 2. Further, in some cases, the payroll payment frequency, i.e., how often a payroll payment is to be made to each employee, may be specified by the employee.

As one example, suppose that an employee 114 performs work for the employer 112 for a first amount of time over a pay period, and that payroll processing information 128 is sent to the service computing device 104. The payroll module 124 may receive the payroll processing information 128, and may determine the amount of compensation due to be paid to the employee based on the payroll processing information 128 for the current pay period. In some examples, as discussed additionally below, the payroll module 124 may send a compensation confirmation request 130 to the employer computing device 108, to provide the employer 112 with the opportunity to check and/or approve the amount of compensation to be paid to each employee 114. For instance, the compensation confirmation request 130 may be presented in the UI 122 by the employer application 110. The employer 112 may check the compensation due to be paid to each employee and may send a compensation confirmation 132 back to the service computing device 104 to approve the amount of compensation to be paid. Further, in other examples, the compensation confirmation request 130 and the compensation confirmation 132 are not used or are optional. Additionally, in some examples, the compensation confirmation request is sent if a risk analysis indicates that a payment amount may be fraudulent or otherwise incorrect.

In response to determining the amount of compensation to be paid to each employee and receiving the compensation confirmation 132, the payroll module 124 may determine a total payroll payment amount 134 to send as a request for a transfer of funds from an employer bank 136 to a service provider bank 138. In some examples, the total payroll payment amount 134 may be the total amount of the payroll payments that will be paid for the current payroll period. In other examples, the total payroll payment amount 134 may include the total amount of payroll payments for the current payroll period and the total amount of payroll payments for one or more previous payroll periods. For instance, the payroll service may pay the employees with a different frequency than the requests for the transfer of funds are submitted to the employer bank 136. As one example, the employees may be paid every day, but a request for transfer of a cumulative total amount of payroll payments might be sent only every week, every two weeks, or the like.

The payroll module 124 may send the total payroll payment amount 134 to one or more employer bank computing devices 140 corresponding to the employer bank 136 to request transfer of funds to the service provider bank 138. Additionally, in some examples, the total payroll payment amount 134 may include an amount of tax withholdings that will be withheld from the payroll payments to be made to the employees, and which will be used for a separate payment of taxes to one or more government entities on behalf of the employees 114. In other examples, the payroll service may send a separate request for a separate transfer of funds for the taxes to be paid on behalf of the employees. For instance, the frequency with which the taxes are paid to the government may be different from the frequency with which the employees are paid, and may also be different from the frequency with which funds are requested to be transferred to reimburse the service provider for the payroll payments made to the employees.

In response to receiving the request for transfer of the total payroll payment amount 134, the employer bank computing device 140 may transfer the total amount of the payroll payments to the service provider bank 138, such as to one or more service provider bank computing devices 142. For example, the employer bank 136 may transfer funds to the service provider bank 138 using any suitable money transferring technique, and typically may use a batch-processed transfer of funds. As one example, in the United States, bank-to-bank transfers of funds may be made using a batch fund transfer technique referred to as an ACH (automated clearing house) payment. For example, ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

The employer bank 136 may perform the batch fund transfer 144 to transfer the total payroll payment amount to the service provider bank 138. Thus, the service provider bank computing device 142 may receive the batch fund transfer 144, or may receive at least a notification that the batch fund transfer 144 is complete. In addition, the service provider bank computing device 142 may provide an indication to the service computing device 104 that the batch fund transfer 144 is complete.

In some examples, the service provider 102 may make payroll payments 146 to the respective employees 114 prior to completion of the batch fund transfer 144 from the employer bank 136 to the service provider bank 138. For example, the payroll module 124 may send payroll payment information 148 to the service provider bank computing device 142 to instruct or otherwise request the service provider bank 138 to send the payroll payments 146 using a payment technique specified by at least one of the employer or the respective employee. The payroll payment information 148 may identify each employee 114 that is to receive a payroll payment for the current payroll period and may specify the amount of money to be paid to each employee. The payroll payment information 148 may further specify how each employee is to be paid, such as by providing the employee's full name, employee's bank account information, the employee's mailing address and/or various other information about the employee and or the payroll payment to be made to the employee. As one example, the payroll payments 146 may be made by near real-time direct money transfer to a respective employee account 150 for each employee 114. As another example, a payroll payment 146 may be made by a check that is mailed to a mailing address of the employee 114, or that is delivered to the workplace of the employee 114 for distribution by the employer 112. As still another example, the payroll payment may be made by direct deposit using a batch fund transfer technique, such as an ACH payment.

In some implementations, the service provider 102 may use a near real-time direct money transfer technique, rather than ACH or other batch processing techniques, for sending payroll payments 146 to the employee account(s) 150. Accordingly, the employees are able to receive a payroll payment on the same day as the day on which the work was performed. Thus, the service computing device 104 may send an electronic communication that causes the payroll payments 146 to be sent to respective employee accounts 150 in near real-time, e.g., within a matter of seconds or minutes. For instance, notification of the payroll payment 146 may be received by one or more employee bank computing devices 154. In some examples, the payroll payments 146 may be sent via near real-time payment techniques that utilize debit card information associated with the respective employee accounts 150. For example, debit card payments may be used to transfer the payroll payment 146 for receipt in near real-time, e.g., generally within a matter of seconds. Contrasted with ACH or other batch-processed money transfer techniques, which may take several days, the payroll payment 146 made using debit card information of the employees (or other account information enabling near real-time transfer of funds) enables the payroll payment to be received and accessed by the employee on the same day, same hour and/or same minute as when the payroll payment 146 is initiated by the payroll module 124 and/or the service provider bank 138. In some examples, the payroll service may receive, on the same day, a confirmation communication that the payroll payment has been received or otherwise deposited into the account 150 of the employee.

The employee information 118 maintained for individual employees may include a debit card number corresponding to the bank account 150 of the respective employee. The service provider bank computing device 142 may be configured to communicate with the one or more computing devices (not shown in FIG. 1) of an interbank network (e.g., Pulse®, Cirrus®) which enable near real-time transfer of funds. For example, the interbank network may enable a single message format for fund transfers whereby the service provider bank computing device 142 may communicate directly or indirectly with the employee bank 152 through the interbank network for sending the payroll payment to the employee bank in near real-time, e.g., often in less than one minute, and typically in a matter of several seconds.

As mentioned above, the payroll payments 146 may be sent before the batch fund transfer 144 has been completed and/or before the batch fund transfer 144 has been requested. Accordingly, in some cases, the payroll payments 146 may equate to a cash advance from the service provider 102 to the employer 112 since the money for the payroll payments 146 may be removed from a service provider account 156 at least several days before the batch fund transfer 144 is received from an employer account 158. Thus, the service provider 102 may be taking on some risk, such as that the employer 112 may go out of business before repaying the service provider 102, the employer 112 may not have sufficient funds to repay the service provider 102, an employee may have fraudulently claimed to work more hours than were actually worked, an employee may have fraudulently increased his or her compensation amount, and so forth. Consequently, in some examples, the service provider 102 may perform a risk analysis prior to initiating sending of the payroll payments 146. Alternatively, in other examples, the service provider 102 may collect funds in advance from the employer 112 that may be used, at least in part, to make the payroll payment 146.

In some cases, when determining whether to make a payroll payment 146 based on a risk analysis, a risk module 160 may be executed by the service computing device 104 to determine e.g., the current financial position of the employer 112. Accordingly, the risk module 160 may determine the total payroll payment amount 134, and may determine a risk associated with paying the one or more employees 114 prior to receiving the batch fund transfer 144 from the employer account 158. The risk module 160 may determine a likelihood that the employer 112 will be able to pay the payroll service provider for the payroll payment 146 based on various factors determined about the employer 112 and/or the employer's business. For instance, the risk module 160 may employ one or more statistical models and/or may apply one or more metrics to determine whether the employer is likely to be able to pay for the payroll payments, and further, may apply one or more additional metrics to guard against the possibility of fraud by an employee or an otherwise incorrect payroll payment amount. Thus, the risk module 160 may determine, e.g., based on the one or more statistical models and/or the one or more metrics, whether the employer is likely to have sufficient funds to pay for the one or more payroll payments 146. Further, the risk module 160 may check for possible fraud, such as by checking for changes in employee compensation from one pay period to the next that exceed a threshold level of change.

Examples of other suitable metrics include at least one of: whether an amount of the one or more payroll payments 146 exceeds a threshold amount (which may be indicative of fraud or an otherwise incorrect payment amount); whether the amount of sales of the employer over a recent period of time is substantially less than historical sales; whether the employer has a history of not repaying payroll advances; whether any money has been received in advance from the employer for payment of the payroll (e.g., from money withheld from sales revenue); whether money is available from current sales revenue and the payroll service is authorized to use this money; whether an amount of inventory that the employer has on hand is indicative that the employer is solvent within a threshold level; whether predicted gross margins of the employer are within an threshold range, as determined, e.g., based on prices that the employer charges for items, prices the employer pays for items, and labor costs of the employer. Further, the service provider may also take into consideration information regarding the employer's purchases as a buyer when purchasing items from other merchants that use the payment service of the service provider. Several examples of suitable statistical models that may be used to predict whether payroll payments should be made in advance for a particular employer may include regression models, such as linear regression models, and stochastic models, such as Markov models, hidden Markov models, and so forth.

In some cases, when the risk module 160 identifies the possibility of employee fraud or an indication of an otherwise incorrect payroll payment amount, such as an unusually large change in compensation from one pay period to the next, the risk module 160 may send the compensation confirmation request 130 to the employer 112, and may await receipt of the compensation confirmation 132 from the employer 112 prior to sending one or more of the payroll payments 146. Further, if the risk module 160 determines that the employer's financial position does not meet a threshold level, e.g., the employer's recent sales are weak or the employer was late repaying a previous payroll advance, the payroll service may await completion of the batch fund transfer 144 prior to sending the payroll payments 146.

In addition, in some examples, the employer 112 may provide one or more payments to the service provider bank 138 in advance of, and in anticipation of, the payroll payments to be made to the employees 114. As one example, the employer may provide a bond or advance payment to the service provider 102 from which the service provider may deduct the payroll payments 146. As another example, the service provider 102 may also provide a payment service, and the service provider 102 may deduct a portion of the transaction payments received by the employer 112 and may use this money to make at least some of the payroll payments 146.

In addition, in some examples, an individual employee may be able to specify a frequency with which the individual employee will receive the payroll payments 146. For example, because the service provider 102 may send the payroll payments 146 without waiting for the corresponding batch fund transfer 144, the service provider 102 may pay an employee on the same day on which the employee performs the work for which the employee is being paid. As one example, the payroll module 124 may receive, e.g., from a computing device associated with the employer or a computing device associated with the employee (not shown in FIG. 1), payroll information for the plurality of employees, wherein the payroll information includes an indication of a frequency with which the employee is to be paid. Accordingly, the decision by the payroll module 124 as to when to send an instruction to cause the service provider bank 138 to make payroll payments 146 to particular employees 114 may depend at least in part on the frequency with which each of the employees is to be paid, as indicated e.g., in the employee information 118.

Figure 2:
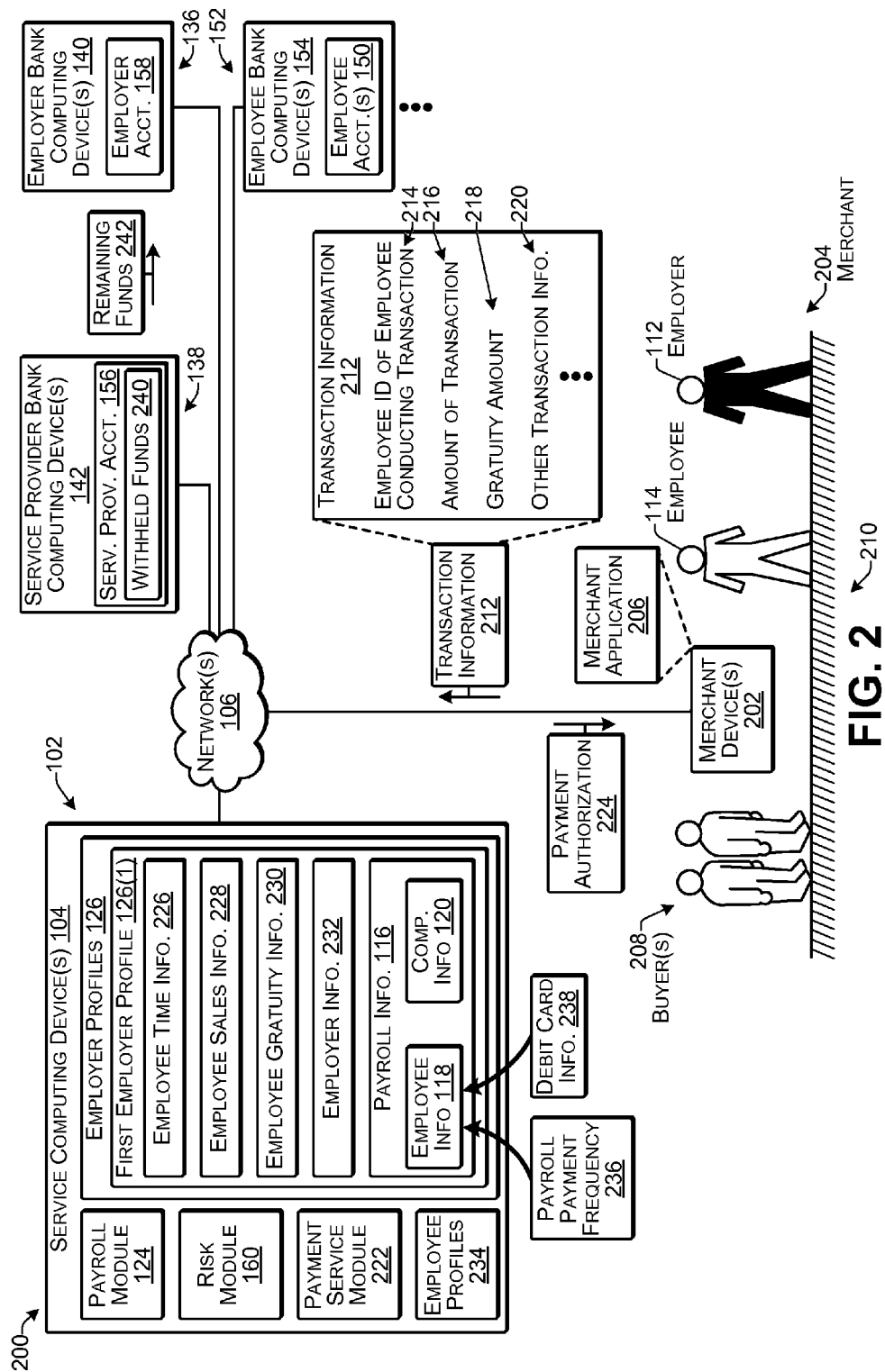
FIG. 2 illustrates an example environment for a payroll and payment service according to some implementations.

FIG. 2 illustrates an example environment 200 for a payroll and payment service according to some implementations. For example, the service provider 102 may provide the payroll service, as discussed above, and may also provide a payment service that enables merchants to conduct point of sale (POS) transactions with buyers who acquire items from the merchants. In some cases, as discussed additionally below, the payment service and the payroll service may be able to share information, e.g., information from the payment service may be used to determine at least a portion of compensation due to one or more employees, such as for gratuities, commission, hourly wages, and the like. Further, information from the payment service may be used at least in part to determine a risk assumed by service provider when making a payroll payment prior to receiving a fund transfer from the employer's account.

In the illustrated example, at least one merchant device 202 is able to communicate over the one or more networks 106 with the one or more service computing devices 104 of the service provider 102. In some examples, the merchant device 202 may be the same computing device as the employer computing device 108 discussed above with respect to FIG. 1. In other examples, the merchant device 202 may be a different computing device. The merchant device 202 may be associated with a merchant 204, which may include the employer 112 and/or one or more employees 114 or other agents of the employer 112.

Additionally, in some examples, a plurality of other merchant devices (not shown in FIG. 2) may be associated with a plurality of other merchants who may also participate in the payment service provided by the service provider 102. Each merchant device 202 may include an instance of a merchant application 206 that is executed on the merchant device 202. The merchant application 206 may provide POS functionality to the merchant device 202 to enable the merchant 204 to accept payments from one or more buyers 208 at a POS location 210. For example, the merchant 204 may use the merchant device 202 to accept payments through various different types of payment instruments, e.g., payment cards, electronic payment, cash or check, at the POS location 210 from the one or more buyers 208.

Regardless of the type of payment instrument used, the merchant 204 and the buyer 208 may conduct a transaction by which the buyer 208 acquires an item from the merchant 204 at the POS location 210. The merchant application 206 on the merchant device 202 may send transaction information 212 to the service computing device 104, e.g., while the transaction is being conducted at the POS location 210. In other examples, such as if the merchant device 202 is processing transactions offline, the transaction information 212 may be sent in a batch at a subsequent point in time or using other suitable techniques.

The transaction information 212 may include an employee identifier 214 associated with the particular employee 114 that is conducting the transaction. For example, the employee 114 may login to the merchant device 202 using a pin, a login ID, biometric information, or the like, to provide an indication that the particular transaction is being conducted by the particular employee. In some examples, multiple employees 114 may share a merchant device 202 and may enter a pin, biometric information, or other identifier 214 before each transaction to indicate which employee should receive credit for conducting the particular transaction. The transaction information 212 may further include an amount 216 of the transaction, such as a total amount, amount per item, etc., and may further include a gratuity amount 218 associated with the transaction if any.

The transaction information 212 may include other transaction information 220 such as regarding the time and place of the transaction, information related to the item(s) acquired, a type of payment being used (e.g., cash, check, payment card, electronic payment), as well as additional information, such as buyer identifying information. For instance if a payment card, such as a credit card, debit card, charge card, prepaid card, or the like, is used as a payment instrument, the transaction information 212 can include data stored in the payment card, e.g., Track 1 data (cardholder name, card number and other card information). In addition, when completing the transaction, a buyer 208 may sometimes provide an email address for receiving a receipt through email, a phone number for receiving a receipt via text message, or the like. Additional examples of other transaction information 220 that can be captured include detailed item information, e.g., descriptors of the items (size, flavor, color, model, etc.), geolocation data indicating a geographic POS location of a particular transaction, online/offline card data, data describing the merchant 204 and/or the merchant device 202, e.g., a merchant identifier, a merchant category code (MCC), or the like.

A payment service module 222 on the service computing device 104 may receive the transaction information 212 and may associate the transaction information 212 with a particular employer profile 126(1) maintained by the service computing device 104 for the particular employer 112. In addition, if the buyer 208 is using a payment instrument, such as a payment card or an electronic payment account, that requires authorization, the payment service module 222 (or, alternatively, the service provider bank 138) may determine whether the payment instrument is authorized to be used to pay for the transaction. As one example, at least a portion of the transaction information 212 (e.g., card information and transaction amount) may be routed by the payment service module 222 (or by the service provider bank 138) through an appropriate card network (e.g., a payment clearing house network as discussed additionally below with respect to FIG. 8) to the cardholder's issuing bank (not shown in FIG. 2). The cardholder's issuing bank responds by approving or declining the transaction, such as after checking that the card information is valid, there is sufficient credit in the cardholder's account, etc. The issuing bank sends a response code back through the card network to the payment service module 222 (or the service provider bank 138). If the payment instrument is authorized, the payment service module 214 (or the service provider bank computing device 142) may send the response code with a payment authorization 224 to the merchant device 202 to indicate to the merchant 204 that payment using the payment instrument has been approved. The merchant device 202 and/or the service provider 102 may store the response code for future use during settlement of the transaction amount as discussed additionally below. Alternatively, if the issuing bank does not authorize the transaction, then the payment service module 222 (or the service provider bank 138) may send back a message (not shown in FIG. 2) that includes a code indicating that the payment instrument is not authorized. In this situation, the buyer 208 may need to provide a different form of payment.

In addition, at least a portion of the transaction information 212 may be associated with the employer profile 126(1) corresponding to the particular merchant 204 and employer 112. For example, the transaction information 212 and other information received from the merchant device 202 may be used to determine employee time, employee sales, and/or employee gratuities. Thus, when an employee arrives at work, the employee may login to the merchant device 202, which may serve the same purpose as punching a time clock, and this login information may be sent to the service computing device 104. Similarly, when the employee leaves for the day, the employee may logout of the merchant device 202, and this logout information may also be sent to the service computing device 104. Accordingly, the service computing device 104 may store employee time information 226 in the first employer profile 126(1) corresponding to the particular merchant 204 and the employer 112. The payroll module 124 may use the employee time information 226 to determine payroll payments for individual employees of the employer 112, such as based on an amount of time worked by each employee 114.

Additionally, the service computing device 104 may determine employee sales information 228 from the transaction information 212. For example, if an employee works for a commission, such as a percentage of gross sales, the employee sales information 228 may include the aggregated sales (e.g., amounts 216 of transactions) associated with each employee ID 214 per period of time, such as over the past day, past week, past month, etc. Further, in a situation in which multiple employees 114 share a register, each employee can enter a pin before registering one or more sales. The payroll module 124 may determine payroll payments to be made to individual employees based on one or more payroll rules established by the employer 112, such as the employee is paid an hourly wage plus 10% of gross sales, or other suitable payroll rule. As an example, if the employee has elected to be paid at the end of each day, the payroll module 124 may determine the employee's sales commission on a daily basis, e.g., after the employee logs out for the day, and may send a payroll payment to the employee's account to pay the employee on the same day as the day on which the work was performed using near real-time payment techniques.

Further, if the employee works in an industry in which tipping is customary, then employee gratuity information 230 may be determined. For example, if the employee works for gratuities as a part of the employee's compensation, the payroll module 124 may determine the gratuity amounts 218 received in association with each employee ID 214 per pay period, such as over the past day, past week, past month, etc., and the payroll module 124 may determine payroll payments to be made to the employee based on one or more payroll rules established by the employer 112, such as the employee gets paid 80% of gross gratuities, with the other 20% going to other employees, or other suitable payroll rule.

Further, the first employer profile 126(1) may include employer information 232, which may include payroll-related information about the employer 112, such as the employer's tax identification number, the employer's bank account information, and so forth. In addition, the first employer profile 126(1) may include the payroll information 116, as discussed above. The payroll information 116 may include the employee information 118 and the compensation information 120, which may be included for each employee 114, and which may be added to the payroll information 116 for the particular employer. Examples of the employee information 118 may include the employee's full name, mailing address, telephone number, email address, taxpayer identifier, date of birth, federal withholding information (e.g., a filled-out IRS Form W-4), state withholding information, employment eligibility information (e.g., completed US Customs and Immigration Service Form 1-9), bank account information for receiving payroll payments, and so forth.

In some examples, the service provider 102 may maintain separate employee profiles 234 that may be managed by the respective employees for maintaining and updating at least a portion of the employee information 118. Accordingly, the employee 114 may update the employee information 118 in the employee's own respective employee profile 234, such as by accessing the employee profile 234 through a browser or other application on an employee computing device (not shown in FIG. 2), on the merchant device 202, or the like. The payroll module 124 may automatically apply any updates without any action on the part of the employer 112 to the employee information 118 in the payroll information 116. As one example, suppose that the employee 114 wishes to change the number of withholding exemptions in the employee's W-4 form. The employee 114 does not have to ask the employer for access to the employee's information, but rather may access the employee profile 234 and make the desired changes to the withholding exemptions. Changes to other types of information such as address, phone number, email address, etc., may be made in a similar manner.

Further, in some examples, the employee 114 may change the employee's payroll payment frequency 236, if desired, such as by accessing the employee's own employee profile 234. For example, the payroll module 124 may schedule a next payroll payment to be made to the employee based, e.g., on a start date or last payroll payment date of the particular employee and an indicated payroll payment frequency 236. In some examples, the employee 114 may initially have a default payroll payment frequency 236, e.g., daily, weekly, etc., and the employee 114 may access the employee profile 234 to change the payroll payment frequency 236. Alternatively, in other examples, the employer 112 may control access to the employee information 118, and the employer 112 may specify or change the payroll payment frequency 236 for particular employees based on requests from the particular employees. In such a case, the payroll information 116 received by the payroll module 124 from the employer 112 may specify a payroll payment frequency 236 indicating how frequently an individual employee is to be paid.

As one example, suppose that the employer 112 by default signs up new employees to be paid on a weekly basis, such that a payroll payment is issued at the end of each week for the work performed that week. Furthermore, suppose that the employer 112 allows the employees the option to select one or more alternative payroll payment frequencies, such as daily, every other day, every two weeks, monthly, etc. In addition, suppose that after several weeks of receiving a weekly payroll payment, a particular employee 114 decides that she would prefer to be paid on a daily basis for the work performed the same day. In some cases, if she has not done so already, the particular employee 114 may provide debit card information 238 (e.g., a debit card number) for the corresponding employee bank account 150 to enable the payroll payments to be made directly to the employee bank account 150 in near real time. Alternatively, if the employee does not desire to provide debit card information 238, the payroll payments 146 may still be made on a daily basis, such as by check or by direct deposit to the employee account 150, e.g., using ACH payments, but receipt of these payroll payments by the employee may consequently be delayed by several days and will therefore not be received the same day or in otherwise near real time.

As mentioned above, to change the payroll payment frequency 236, the particular employee 114 may access the corresponding employee profile 234. For example, the employee 114 may be able to access an employee dashboard or other user interface (not shown in FIG. 2) that allows the employee to select the payroll payment frequency 236, and that further allows the employee 114 to enter debit card information 238 for receiving the payroll payments in near real time. Alternatively, e.g., if the service provider 102 does not maintain employee profiles 234, the employer 112 may access the employee information 118, such as using the UI 122 discussed above with respect to FIG. 1, and may change the payroll payment frequency 236 for the particular employee to the desired frequency. Further, if necessary, the employer 112 may enter the employee's debit card information at the same time. In response to receiving the update to the payroll payment frequency 236 for the particular employee, the payroll module 124 may determine when the last payroll payment was provided to the particular employee and, based on this information, may determine when the next payroll payment is to be made. Thus, the payroll module 124 may begin making the payroll payments according to the specified payroll payment frequency 236 for the particular employee 114.

During business operation, e.g., on a daily basis, as the merchant device 202 sends transaction information 212 to the payment service module 222 for a plurality of transactions, the payment service module 222 may construct a log of all the transactions for the merchant 204. Thus, the service provider 102 may receive an indication of an amount of funds that will be received for payments made in association with one or more transactions conducted by the merchant 204. As mentioned above, in the case that buyers 208 use payment cards or electronic accounts for making payments to the merchant 204, the service provider bank 138 may act as an acquiring bank for the payments, and the log may include the authorization codes received from issuing banks for respective authorized transactions, as mentioned above. Thus, at the end of each day, the payment service module 222 may provide the authorized transactions to the service provider bank 138, and the service provider bank 138 may transmit the authorizations to the appropriate card network. The card association (e.g., Visa®, MasterCard®, etc.) debits an account of the issuing bank and credits an account of the acquiring bank, i.e., the service provider bank 138. Further, the service provider bank 138 credits the service provider's account 156 in the amount of the authorized transactions.

Additionally, the payment service module 222 may total the sales receipts of all of the transactions for the particular merchant 204 to determine a total sales revenue after taxes and payment processing fees are deducted. For instance, the payment service module 222 may deduct a first percentage from the daily sales revenue as a payment processing service fee. In addition, with authorization from the employer, the payroll service may further deduct, as withheld funds 240, a specified percentage from the daily sales revenue to be used for payroll payments, such as for future payroll payments, or as repayment for payroll payments already made. The payment service module 222 may then transfer the remainder of the sales revenue to the employer bank account 158 as remaining funds 242, such as via an ACH batch fund transfer. Accordingly, using this technique, the payroll service may receive at least some money for paying the payroll payments in advance, or at least sooner than would be the possible with an ACH fund transfer. Further, in the case that the service provider withholds money in advance, the service provider may save the withheld funds 240 to the service provider account 156 and may offer interest to the employer, or other incentives, to encourage the employer to participate in the withholding of money to be used to pay the payroll payments.

In addition, the payment service module 222 may predict the amount of money to be withheld to make the payroll payments based on employment history of the employer and/or employment histories of merchants that operate businesses that are similar to the employer. For example, suppose that the employer 112 operates a business that includes seasonal fluctuations in the number of employees that are used during certain times of the year. Thus, if the merchant conducts 50% of its yearly business between November fifteenth and December thirtieth, the payment service module 222 may begin deducting additional money from the receipts of the merchant as the middle November approaches in anticipation of the employer hiring additional employees during that time of the year.

The payment service module 222 may make the determination of how much money to deduct for payroll payments based on one or more statistical models of the employment histories of the particular merchant and/or a plurality of other merchants that operate businesses similar to the particular merchant. For example, taking into consideration the payroll histories of similar merchants can help smooth out or eliminate possible outliers or other anomalies in the payroll history of the particular merchant. Several examples of suitable statistical models that may be used to predict changes in payroll payments for a particular employer may include regression models, such as linear regression models, and stochastic models, such as Markov models, hidden Markov models, and so forth.

Furthermore, suppose that the one or more statistical models indicate that October is typically a poor month for the employer and for other merchants that operate similar businesses. Accordingly, rather than withholding money from the sales revenue during October, the service provider 102 may advance money to the merchant. The service provider 102 may then be repaid by deducting a larger portion of sales revenue during traditionally better sales months, such as November and December.

FIGS. 3-7 are flow diagrams illustrating example processes according to some implementations. The processes of FIGS. 3-7 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-7 may be combined with some or all of the operations illustrated in others of FIGS. 3-7. For discussion purposes, the processes are described with reference to the environments, architectures and devices described in the examples herein, although the processes may be implemented in a wide variety of other environments, architectures and devices.

Figure 3:
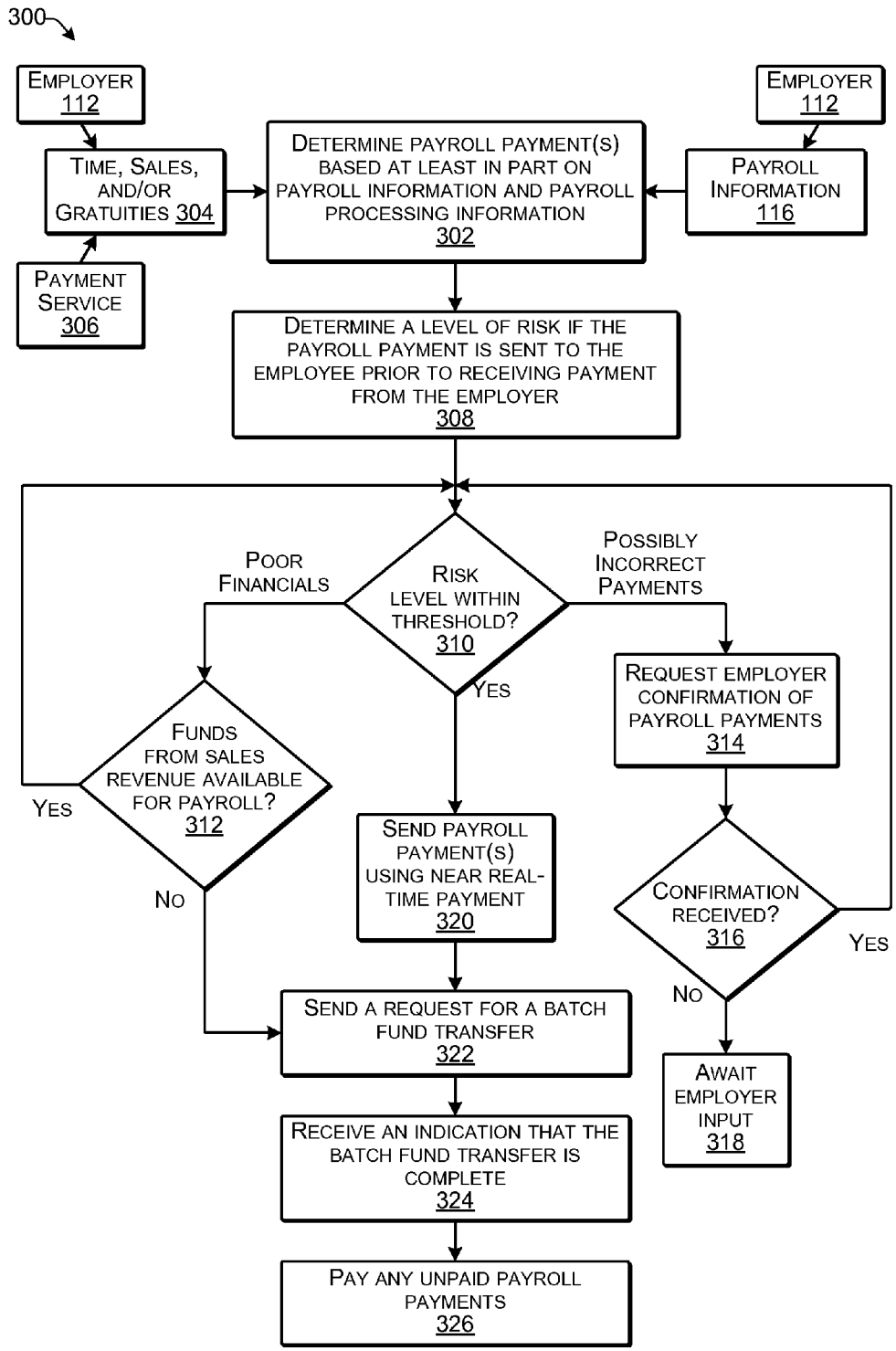
FIG. 3 is a flow diagram illustrating an example process for a payroll service according to some implementations.

FIG. 3 is a flow diagram of an example process 300 that includes making payroll payments prior to receiving a batch transfer of funds from the employer account according to some implementations. In some cases, the example process 300 of FIG. 3 may be executed by the service computing device 104, or by another suitable computing device.

At 302, the computing device may determine one or more payroll payments based at least in part on payroll information 116 (e.g., including compensation information provided by the employer 112) and payroll processing information. For example, the payroll processing information may be used to determine time, sales and/or gratuities 304 attributable to particular employees. For instance, the payroll processing information may be provided by the employer 112 and may include the time, sales and/or gratuities 304. Alternatively, the payroll processing information may be determined from transaction information, including time information (e.g., employee login and logout information), obtained through a payment service 306, as discussed above. Thus, the received transaction information may be used to determine payroll processing information including time, sales and/or gratuities 304. For instance, the payment service 306 may receive time information for particular employees, such as when the employees log in and log out of POS devices of the employer.

In some examples, the payroll service may keep track of the time worked by each employee to determine an amount of time that each employee has worked since a last payroll payment. Alternatively, in other examples the payroll processing information may include the amount time that the employee has worked since the last time that the payroll service made payroll payments. Furthermore, in the case that a particular employee works for a salary, the payroll service can determine this from the payroll information 116, and the time, sales and/or gratuities 304 may not apply to the particular employee. Alternatively, in other cases, even if the employee works for a salary, overtime pay, commissions and/or gratuities may still be included in the compensation of the employee.

At 308, the computing device may determine a level of risk that will be incurred by the payroll service if one or more payroll payments are sent to one or more respective employees prior to receiving payment from the employer for the amount of the payroll. For example, as mentioned above the payroll service may use a plurality of risk models and metrics when determining a level of risk that will be incurred by early payment of one or more patent payroll payments. Metrics that may be considered when determining the level of risk may include metrics directed to the financial position of the employer (i.e., to determine whether the employer will be able to pay back the payroll service), as well as metrics directed to the possibility of fraudulent or otherwise incorrect time entries, or the like, by employees.

Examples of suitable metrics directed to detecting fraudulent or otherwise possibly incorrect payments may include: whether a change in compensation for a particular employee from one pay period to the next exceeds a threshold level of change; whether an overall amount of the payroll payments exceeds a threshold amount; and/or whether an amount of a payroll payment for any one employee exceeds a threshold amount.

Examples of suitable metrics directed to determining the financial position of the employer may include: whether an amount of sales of the employer over a recent period of time is less than historical sales by a threshold amount; whether the employer has a history of not repaying payroll advances; whether money has been received in advance from the employer for payment of the payroll; whether money is available from current sales revenue for payment of the payroll payment; whether an amount of inventory that the employer has on hand is within a threshold level; and/or whether a predicted gross margin of the employer is within an threshold range.

At 310, the computing device may determine based on the above mentioned metrics and/or other factors whether the risk level is acceptable, i.e., within a threshold level of risk. For instance, a risk score may be determined for the payroll payment. If the risk score is below a threshold score, then the risk level may be determined to be acceptable. For example, each metric may be assigned a certain value, and to the extent that metric applies, the value assigned to the metric may be added to the overall risk score. Further, in some examples a pair of risk scores may be used, with a first risk score applying to the financial position of the employer, and a second risk score applying to whether there are fraudulent or otherwise possibly incorrect payment amounts. Thus, both risk scores may be required to be below a threshold level to determine that the risk is acceptable. As mentioned above, one or more trained statistical models may be used for determining values to assign to each metric or any of numerous other metrics or considerations that may be applied when determining the level of risk.

At 312, if the financial position of the employer is determined not to be within an acceptable risk threshold, the computing device may determine whether funds from sales revenue of the employer are available to be used for the payroll payments. For example, the employer may grant, or may have previously granted, permission to the payroll service to withhold a portion of funds from the sales revenue collected by the payment service. Alternatively, the employer may have granted permission for the payroll service to apply funds from the sales revenue received that day, which has not yet been transferred to the account of the employer. In some examples, if the amount of funds available from sales revenue is less than the amount of the payroll payments to be made, the payroll service may deduct the amount of sales revenue funds available from the amount of payroll payments to be made, and may then recalculate the risk level at 310 based on the reduced amount of the payroll payments, which may substantially reduce the assessed risk.

At 314, if the risk analysis indicates, beyond a threshold risk level, the possibility of fraudulent or otherwise possibly incorrect payroll payments, the computing device may request employer confirmation for one or more of the payroll payments. For example, as discussed above with respect to FIG. 1, the payroll service may send a compensation confirmation request to the employer computing device.

At 316, if confirmation is received from the employer, the process may return to 310 to determine whether the risk level is otherwise within an acceptable threshold to proceed with paying the one or more payroll payments.

At 318, if confirmation is not received from the employer in response to the request, the computing device may await employer input prior to making one or more of the payroll payments. For instance, if only one the payroll payments is suspect, the payroll service may pay one or more other payroll payments while awaiting employer confirmation with respect to the suspect payroll payment.

At 320, if the risk level determined at 310 is within an acceptable threshold level, the computing device may cause the one or more payroll payments to be sent to the respective employees using a near real-time payment method, rather than an ACH or other bulk payment method. For instance, the payment may be sent using an interbank network, such as by using debit card information associated with respective bank accounts of the respective employees.

At 322, if the risk level is not acceptable based on the employer's financial position and if there are not sufficient funds available from the employer's sales revenue, the computing device may send a request for a batch fund transfer so as to receive the amount of the payroll payments in a bank account of the payroll service prior to making the payroll payments to the employees. Additionally, if the risk level is acceptable and the payroll payments are sent to the employees, the payroll service may then send the request for the batch fund transfer from the account of the employer to the account of the payroll service as repayment for the payroll payments made to the employees. As one example, the employees might be paid every day, but the request for the batch fund transfer might be sent only once per week, once every other week, or the like.

At 324, the computing device may receive an indication that the batch fund transfer is complete. For example, it may take several days for the batch transfer of money from the bank account of the employer to the bank account of the payroll service. Accordingly, the service computing device may subsequently receive an indication from the bank of the payroll service when the transfer has been completed.

At 326, in response to receiving the indication that the transfer to the bank account of the payroll service is complete, the payroll service may pay any unpaid payroll payments, such as payroll payments that may have not been paid due to an unacceptable risk determined at 310.

Figure 4:
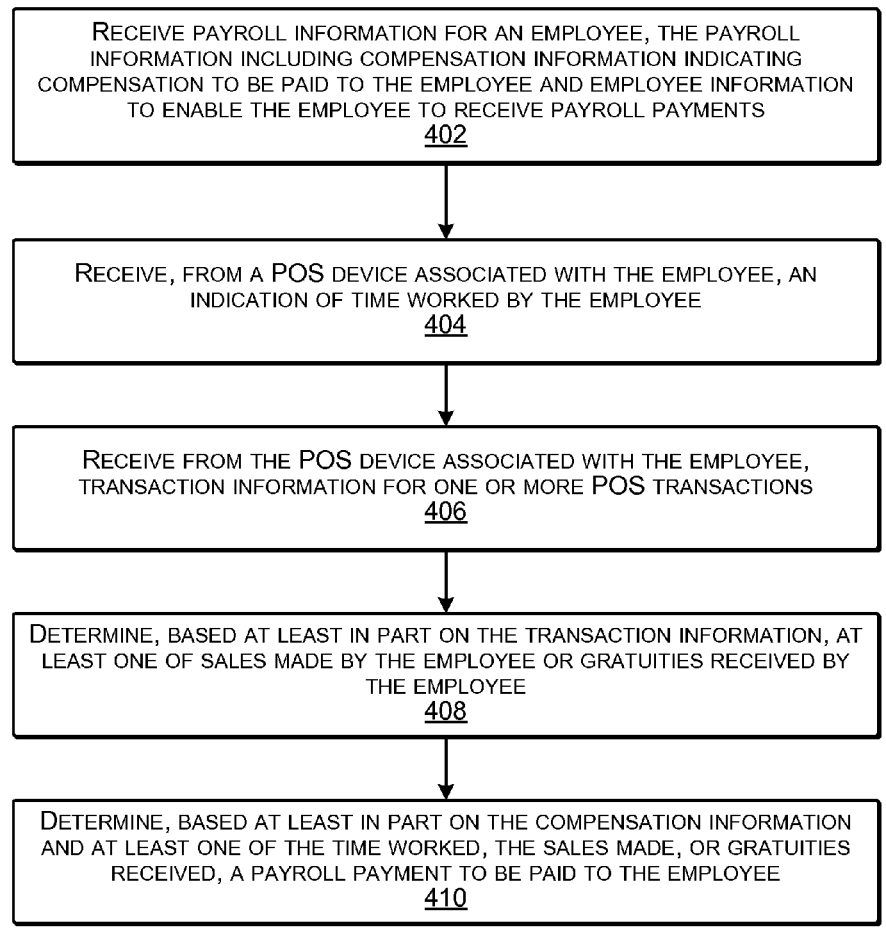
FIG. 4 is a flow diagram illustrating an example process for a payroll service according to some implementations.

FIG. 4 is a flow diagram illustrating an example process 400 in which transaction information from a payment service may be used at least in part to determine payroll payments according to some implementations. In some examples, the process 400 may be executed by the employee device 110, or by another suitable computing device.

At 402, the computing device may receive payroll information for an employee. For example, the payroll information may include compensation information indicating an amount of compensation to be paid to the employee (e.g., hourly wage, salary, commission amount, overtime wages, and so forth), and may further include employee information such as identification information, mailing address information, tax withholding information, bank account information, and other information to enable the employee to receive payroll payments.

At 404, the computing device may receive, from a POS device associated with the employee, an indication of time worked by the employee. For example, when the employee comes in to work, the employee may login to a POS device or other suitable computing device of the employer to provide a time card-like indication that the employee is now on the clock. In other examples, rather than having to log in to a POS device, other timekeeping techniques may be utilized, as is known in the art.

At 406, the computing device may receive, from the POS device associated with the employee, transaction information for one or more POS transactions. For example, while the employee is logged in to the POS device, the employee may conduct one or more POS transactions with one or more buyers for the sale of one or more items, as discussed above. The transaction information may be sent to the service computing device of the service provider and maintained in a log that keeps track of the transactions conducted throughout the day. Additionally, in some examples, multiple employees may share a single POS device and may enter a pin, fingerprint, or other identifier when conducting a particular transaction using the POS device. Further, in some examples, the service provider 102 may process payments received by the transactions, such as by authorizing credit card or other payment card transactions, authorizing electronic payment transactions, transferring funds received through payment card transactions or electronic payment transactions, and so forth.

At 408, the computing device may determine, based at least in part on the transaction information, at least one of sales made by the employee or gratuities received by the employee. For example, from the log maintained for the business of the employer and/or for the particular POS device, the payroll service may determine a total amount of sales attributable to a particular employee and/or a total amount of gratuities received by a particular employee. Further, when the employee logs out for the day, such as using the POS device, is logged out automatically based on detection that the employee's shift has ended, or otherwise clocks out for the day using other time tracking techniques, the amount of time worked by the employee may also be determined by the service provider.

At 410, the computing device may determine, based at least in part on the compensation information and at least one of the time worked, the sales made or the gratuities received by the employee, a payroll payment to be paid to the employee. Accordingly, by receiving the transaction information, the payroll service may determine on a daily basis, or even more frequently, such as on an hourly basis, an amount of compensation due to be paid to each employee of an employer that participates in the payment service provided by the service provider.

Figure 5:
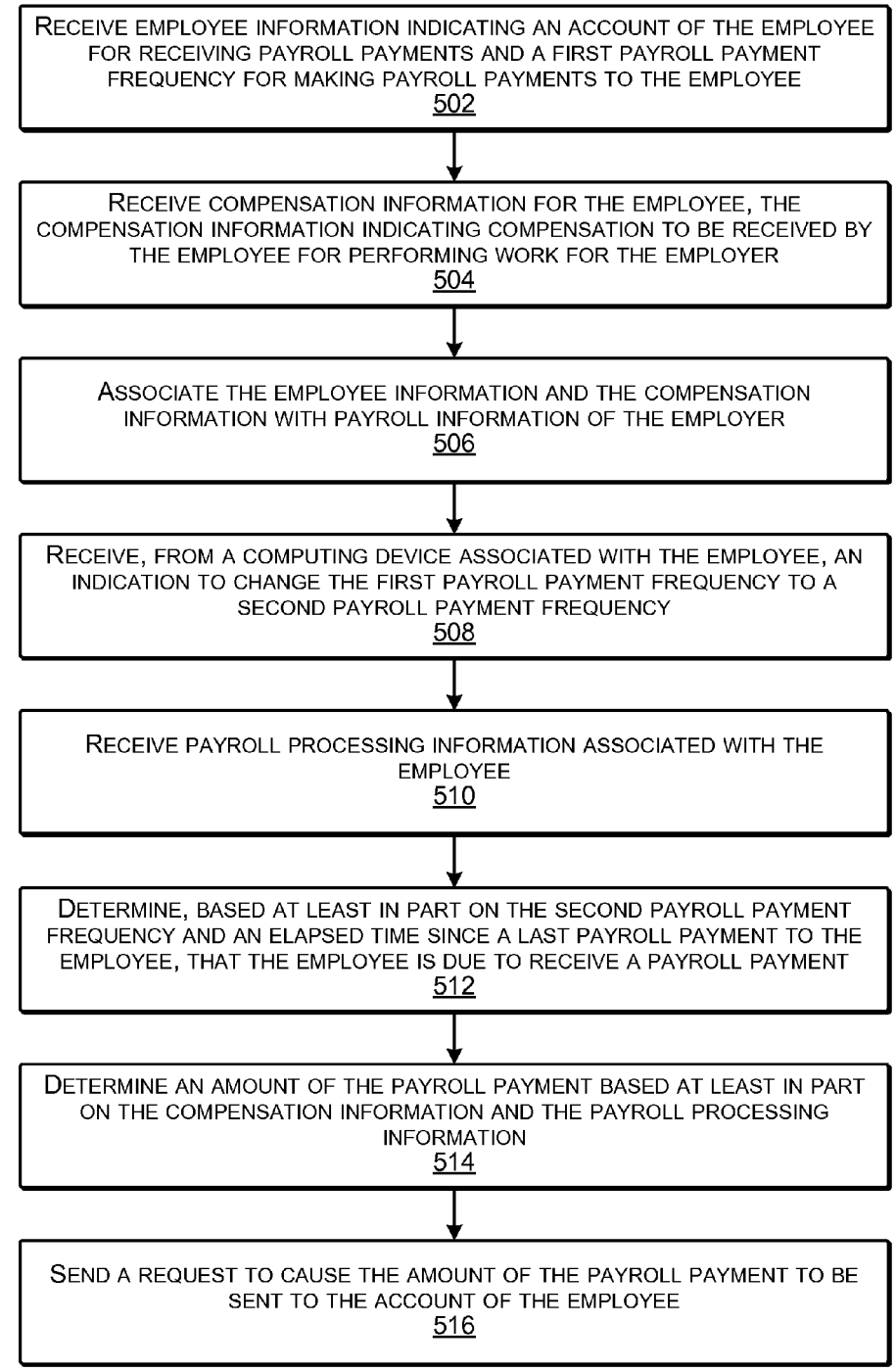
FIG. 5 is a flow diagram illustrating an example process for a payroll service according to some implementations.

FIG. 5 is a flow diagram illustrating an example process 500 that enables employees to select a desired payroll payment frequency according to some implementations. In some examples, the process may be executed by the service computing device 104, or by another suitable computing device.

At 502, the computing device may receive employee information indicating an account of the employee for receiving payroll payments. The employee information may further indicate a first payroll payment frequency specify a frequency with which payroll payments will be made to the employee. As one example, when a new employee is hired, the employer may select a default payroll payment frequency for the employee.

At 504, the computing device may receive compensation information for the employee. For example, compensation information may indicate an amount of compensation (e.g., hourly wage, salary, commission etc.) to be received by the employee for performing work for the employer.

At 506, the computing device may associate the employee information and the compensation information with payroll information of the employer. For instance, the service provider may maintain payroll information for the employer in an employer profile as discussed above.

At 508, the computing device may receive, from a computing device associated with the employee, an indication to change the first payroll payment frequency to a second payroll payment frequency. As one example, the employee may use a computing device of the employer or a computing device of the employee to login to an employee profile maintained by the service provider. The employee may be able to change the payroll payment frequency in the employee profile and may also change or update other employee information maintained in the employee profile, such as tax withholding information, residential address information, or the like. Alternatively, the employee may be able to login directly to the payroll information, such as by using an employee dashboard, which may be presented, e.g., on a POS device or other employer computing device.

At 510, the computing device may receive at least one of payroll processing information or transaction information associated with the employee. For instance, the payroll processing information may include timecard information and other information applicable for determining a payroll payment to be made to the employee. Additionally, or alternatively, transaction information from a payment service may be used to determine an amount of sales attributable to the employee and/or gratuities received by the employee.

At 512, the computing device may determine, based at least in part on the second payroll payment frequency and an elapsed time since a last payroll payment to the employee, that the employee is due to receive a payroll payment. As one example, suppose that the employee decides to switch from being paid on a weekly basis to being paid on a daily basis. Accordingly, the payroll service may determine that the employee is due to be paid at the end of the day based on the selected payroll payment frequency and the amount of time that has elapsed since the last time the employee was paid.

At 514, the computing device may determine an amount of a payroll payment based at least in part on the compensation information and the least one of the payroll processing information or the transaction information. For example, in the case that the employee is paid based on an hourly wage, the amount of time that the employee worked may be determined from the payroll processing information and/or from the transaction information. Furthermore, if the employee works for commission, the amount of sales made by the employee may be determined, and if the employee works for gratuities, the amount of gratuities received by the employee may be determined based on the transaction information. Alternatively, if the employer does not participate in the payment service, the payroll processing information provided by the employer may include the time information, sales information, and/or gratuity information for the particular employee.

At 516, the computing device may send a request to cause the amount of the payroll payment to be sent to the account of the employee. For example, the payroll service bay send an electronic communication to a bank of the payroll service to cause the bank to transfer an amount of the payroll payment from the account of the payroll service to the account of the employee. In some examples, the transfer may be performed in near real time such as based on the use of debit card information associated with the employee's account. Alternatively, of course, other conventional techniques may be used for providing the payroll payment to the employee.

Figure 6:
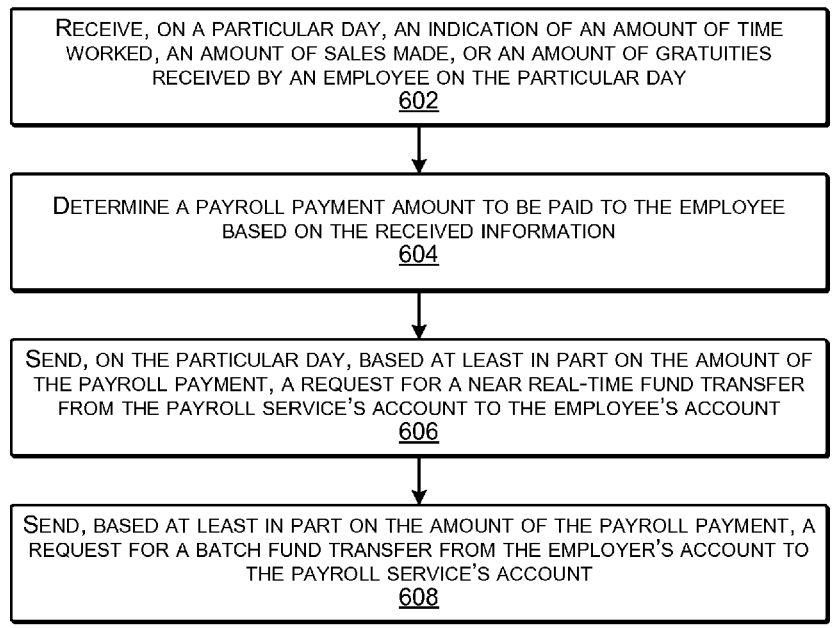
FIG. 6 is a flow diagram illustrating an example process for a payroll service according to some implementations.

FIG. 6 is a flow diagram illustrating an example process 600 that enables employees to be paid on a daily basis for work performed that day according to some implementations. In some examples, the process may be executed by the service computing device 104, or by another suitable computing device.

At 602, the computing device may receive, on a particular day, an indication of an amount of time worked, an amount of sales made, or an amount of gratuities received by an employee on the particular day. As discussed above, in some examples, this information may be determined automatically through employee interaction with a POS device, such as based on employee login and logout time, an amount of sales registered using the POS device while the employee was logged in, an amount of gratuities received through the POS device while the employee was logged in, and so forth. As another example, the employer or the employee may provide this information using other techniques such as by sending the information to the payroll service when the employee has completed his or her shift.

At 604, the computing device may determine a payroll payment amount to be paid to the employee based on the received information. For example, the payroll service may calculate the payroll payment amount based on the amount time worked, whether the employee receives a commission on sales made, and/or whether the employee received any gratuities. In some examples, the employer may have provided rules on how sales commissions are to be determined, and/or gratuities are to be distributed.

At 606, the computing device may send, on the particular day, based at least in part on the amount of the payroll payment, a request for a near real-time fund transferred from an account of the payroll service to an account of the employee. For instance, on the same day as that on which the work is performed, the payroll service may determine the amount of a payroll payment to be paid to the employee, and may cause a near real-time transfer of the amount of the payroll payment from the bank account of the payroll service to the bank account of the employee. As mentioned above, in some examples, an interbank network may be used for transferring the funds, such as by using debit card information associated with the account of the employee.

For example, the interbank network may enable a single message format for transferring money from one account to another in near real time. Furthermore, while implementations herein may describe the transfer as taking place on the same day as the day on which the work was performed, in some examples, the transfer of funds may take place within a 24-hour period, or less, following completion of the work, such as in the case that the employee completes the work late at night, or early in the morning of a following day.

At 608, the computing device may send, based at least in part on the amount of the payroll payment, a request for a batch transfer of funds from an account associated with the employer to the account associated with the payroll service. For example, the payroll service may pay individual employees on a daily basis or the like, but may employ the risk analysis discussed above for determining how frequently to request a batch payment from the employer's account as repayment for the payroll payments made to the employees. For instance, the payroll service may send a request for batch payment on a weekly basis, a biweekly basis or the like.

Figure 7:
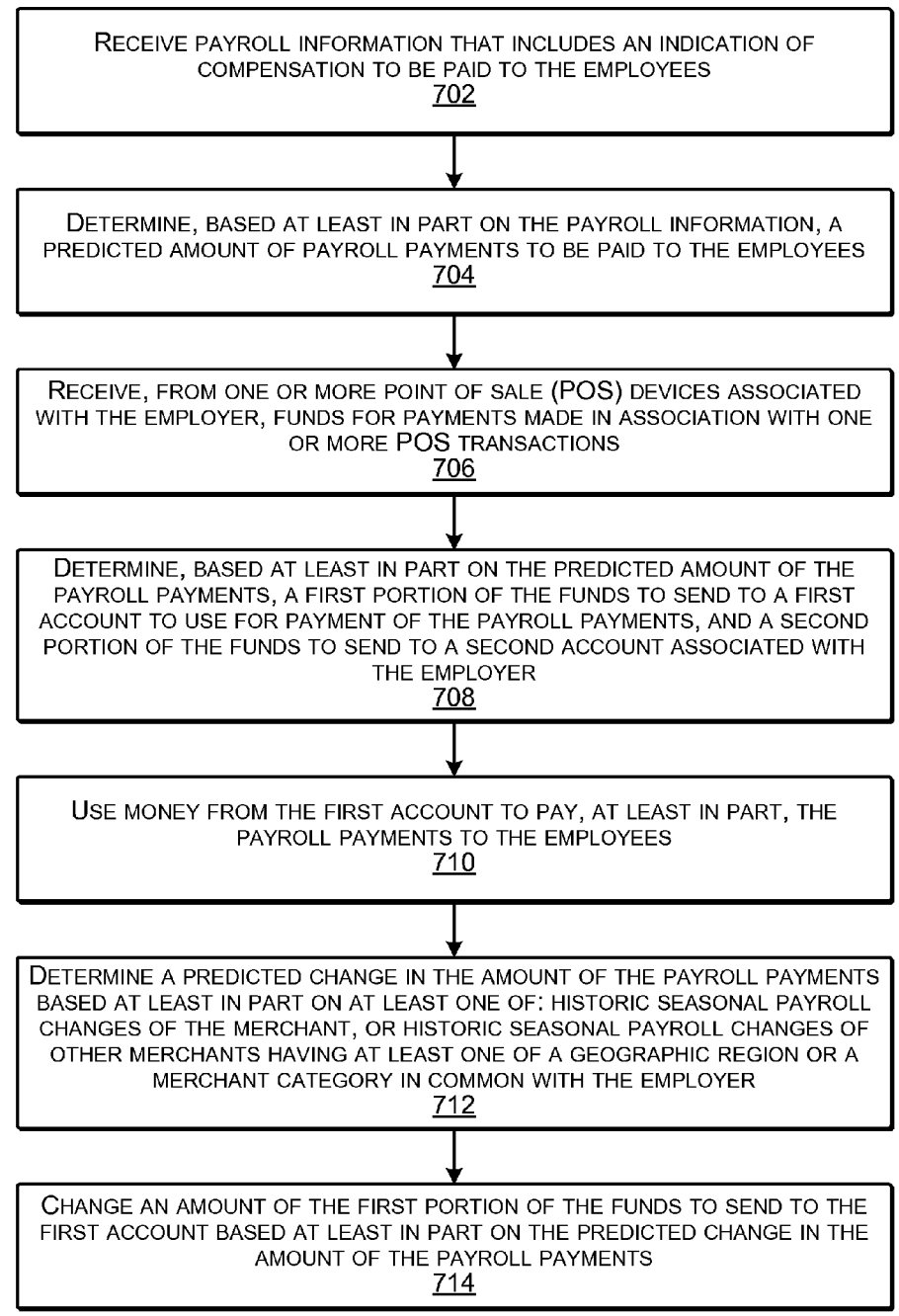
FIG. 7 is a flow diagram illustrating an example process for a payroll service according to some implementations.

FIG. 7 is a flow diagram illustrating an example process 700 in which the payroll service may use funds directly from sales revenue of the employer either before or after making a payroll payment according to some implementations. In some examples, the process may be executed by the service computing device 104, or by another suitable computing device.

At 702, the computing device may receive payroll information that includes an indication of compensation to be paid to the employees of an employer. For example, the payroll information may indicate the number of employees on the employer payroll and how much compensation each employee will be paid such, as on hourly basis, salary, commission, or the like.

At 704, the computing device may determine, based at least in part on the payroll information, a predicted amount of payroll payments to be paid to the employees. For example, the computing device may determine approximately how much the payroll payments will amount to over one or more periods of time, such as per day, per week, per month, or the like.

At 706, the computing device may receive from one or more POS devices associated with the employer, an indication of funds received for payments made in association with one or more POS transactions. For example, the service provider may provide a payment service that processes payments for the employer, such as by authorizing payment card or electronic transactions. The payment service may further receive an indication of the amount of the funds received for those transactions as sales revenue that will be deposited into an account of the service provider, may withhold sales taxes and processing fees from the sales revenue, and may then send a payment to an account of the employer for the remainder of the sales revenue resulting from the transactions. As one example, the service provider may perform this accounting for the business of the employer at the end of each business day.

At 708, the computing device may determine, based at least in part on the predicted amount of the payroll payments, a first portion of the funds to send to a first account to be used for payment of the payroll payments, and a second portion of the funds to transfer to a second account associated with the employer. For example, with authorization from the employer, the payroll service may withhold a portion of the funds credited to the account of the service provider, such as 5%, 10%, or the like, per day, may keep this money into an account associated with the payroll service, and may send the remainder to the account associated with the employer as discussed above.

At 710, the computing device may use money from the first account to pay at least in part the payroll payments to the employees of the employer. As discussed above, the payroll service may pay the employees in some cases prior to receiving a batch transfer of funds from the bank account of the employer. Accordingly, rather than taking a risk of paying the employees prior to receiving funds from the employer, the service provider may use funds from the first account that have been withheld from the sales revenue of the employer's business. Furthermore, if the amount of funds in the first account is not sufficient to cover the entire amount of the payroll payments to be made, the payroll service may also perform the risk analysis discussed above with respect to the remaining amount of the payroll payments that are not covered by the amount of money in the first account. As another alternative, rather than withholding funds in advance, the funds may be withheld after the payroll payments have been made to the employees. As still another alternative, the payroll service may determine a total amount of payroll payments to be made, and may apply at least a portion of the sales revenue received by the employer's business that day to some or all of the payroll payments.

At 712, the computing device may determine a predicted change in the amount of the payroll payments based at least in part on at least one of: historic seasonal payroll changes of the particular merchant, or historic seasonal payroll changes of other merchants having at least one of a geographic region or a merchant category in common with the business of the employer. For example, if the employer's business is substantially busier in the summer months, the employer may hire more employees during those months and may thereby have a larger payroll than at other times of the year. Accordingly, the payment service may determine this based on historic sales revenue of the employer's business, historic sales revenue of similar businesses, such as in the same geographic region and/or the same merchant category, historic payroll payments of the employer or similar merchants, and so forth. In some cases, similar merchants that also use the payment service may be determined based on merchant categories determined, for example, using the merchants' self-declared business category or using merchant category codes (MCC). The MCC is a four-digit number assigned to a business by credit card companies (e.g., American Express®, MasterCard®, VISA®) when the business first starts accepting payment cards as a form of payment. For instance, the MCC for a merchant or other classification techniques may be used to categorize similar types of merchants into merchant categories. In some examples, the merchant categories used herein do not match the MCC categories, but may be more inclusive or less inclusive categories. Similarly, the merchants may be classified into location categories, such as for particular categories of geographic regions, e.g., same street, same neighborhood, same postal code, same district of a city, same city, and so forth.

At 714, the computing device may change an amount of the first portion of the funds to send to the first account based at least in part on the predicted change in the amount of the payroll payments. For example, in anticipation that the payroll costs for the employer will increase substantially due to seasonal fluctuation, the payroll service may begin to withhold a larger percentage of the sales revenue on a daily basis in anticipation of the approach of the seasonal change.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
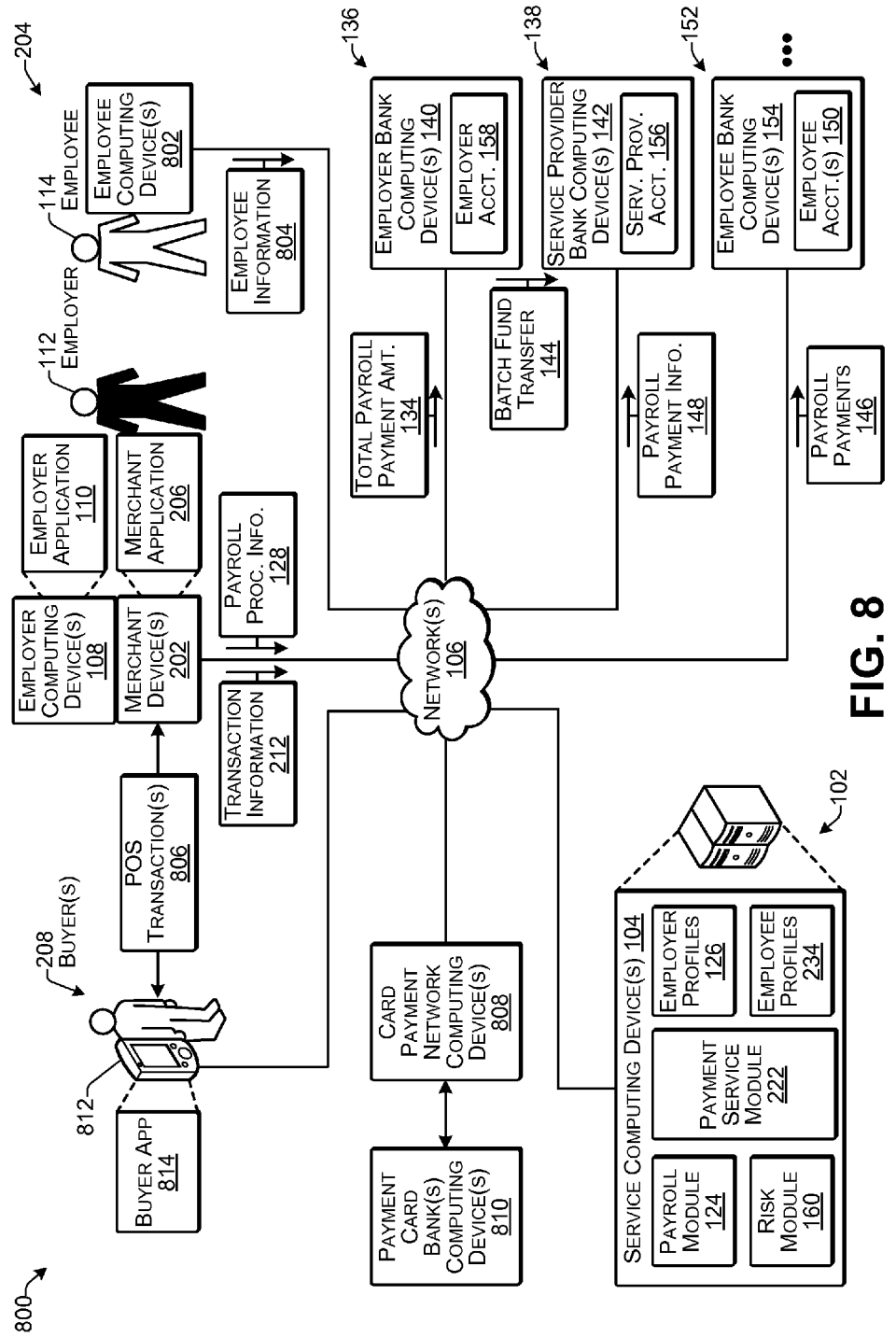
FIG. 8 illustrates an example architecture of a system for providing a payment service and payroll service according to some implementations.

FIG. 8 illustrates an example architecture of a payroll and payment system 800 able to provide a payroll service and/or a payment service according to some implementations. In the example of FIG. 8, the service computing device 104 of the service provider 102 includes the payroll module 124, which may be executed to provide the payroll payment service described herein. In addition, the service computing device 104 includes the payment service module 222, which may be executed to provide the financial payment and POS transaction processing service. In some examples, the employer computing device 108 and the merchant computing device 202 may be the same computing device, while in other examples, they may be separate computing devices. Further, in some examples, the employer application 110 and the merchant application 206 may be part of the same application, while in other examples, they may be separate applications.

In some examples, the payroll module 124 may receive, from an employee computing device 802, or other computing device associated with the employee, employee information 804 from the employee 114, and may associate the employee information 804 with a respective employee profile 234. Further, with authorization from the employee 114, the service provider 102 may associate the employee information 118 with payroll information of the employer, such as in a respective employer profile 126 associated with the employer 112. Subsequently, the payroll module 124 may determine a payroll payment amount to be paid to individual employees on the payroll of the employer.

The payroll module 124 may send payroll related information 134 and 148 to bank computing devices 140 and 142 associated with the employer bank 136 and the service provider bank 138, respectively. For example, the payroll module 124 may request a batch fund transfer 144 as payment from the bank account 158 of the employer 112 to the bank account 156 of the service provider 102 in the amount calculated to be the total payout of the payroll for the current pay period. For instance, the batch fund transfer 144 from the account 158 of the employer to the account 156 of the service provider may be made using ACH batch payment techniques, as discussed above. As mentioned above, in some cases, the service provider 102 may instruct the service provider bank 138 to send payroll payments 146 to employee accounts 150 prior to receiving the batch fund transfer 144. Additionally, in some examples, such as based on results of a risk analysis, the service provider 102 may provide the payroll payment information 148 to the employer computing device 108 for approval prior to sending the payroll payment information 148 to the service provider bank computing device 142.

In addition, when providing the payment service, the payment service module 222 may receive at least transaction information 212 for processing payments made by buyers. For example, the payment service module 222 may receive transaction information 212, such as an amount of a POS transaction 806 and payment instrument information. For instance, if the buyer 208 is using a payment card, the payment service module 222 may verify that the payment card is able to be used to pay for the transaction, such as by contacting a card payment network clearinghouse computing device 808 or a payment card bank computing device 810. The payment service module 222 and corresponding payment functionality may be implemented as one or more computer programs, or other executable instructions, on the service computing device 104 in one or more locations, such as for providing the payment systems, components, and techniques described herein.

In some examples, one or more of the buyers 208 may have a buyer device 812 that can execute a buyer application 814. For instance, some buyers 208 may carry buyer devices 812, such as smart phones, tablet computers, wearable computing devices, or the like, as further enumerated elsewhere herein, and some of these buyer devices 812 may have installed thereon the buyer application 814. The buyer application 814 may include electronic payment capability, which enables the buyer 208 to make a payment to the merchant 204 using an account associated with the buyer application 814, rather than paying with a physical payment card, cash, check, etc. Additionally, while only a single buyer device 812 and a single merchant device 202 are illustrated in the example of FIG. 8, in some implementations, there may be thousands, hundreds of thousands, or more, of the buyer devices 812 and the merchant devices 202.

The one or more networks 106 can include any appropriate network, including a wide area network, such as the Internet; a local area network, such an intranet; a wireless network, such as a cellular network, a local wireless network, such as Wi-Fi and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The employer profiles 126 and/or the employee profiles 234 described herein may be created and maintained using any suitable types of data structures, and using any suitable data storage or database techniques. In some examples, the employee information and other payroll information may be maintained in a relational database in which pieces of information for individual profiles may be stored distinctly from one another, but are related to or otherwise associated with each other in the relational database. For instance, a particular employee profile 234 may be obtained by generating a view of a portion the data related in the database to the particular employee profile 234, or by otherwise extracting the data from the database. Alternatively, of course, other types of storage techniques may be used for generating and maintaining the employee profiles 234 and/or the employer profiles 126.

The payment service can include one or more servers that are configured to perform securely electronic financial transactions, e.g., electronic payments for transactions between a buyer and a merchant, for example, through data communicated between the buyer device 812 and the merchant device 202. Generally, when a buyer and a merchant enter into an electronic payment transaction, the transaction is processed by electronically transferring funds from a financial account associated with the buyer account to a financial account associated with the merchant account.

The payment service module 222 can also be configured to communicate with the one or more computing devices 808 of a card payment network (e.g., MasterCard®, VISA®) over the one or more networks 106 to conduct financial transactions electronically. The payment service 222 can also communicate with one or more bank computing devices of one or more banks over the one or more networks 106. For example, the payment service module 222 may communicate with the employer bank computing devices 140, the service provider bank computing devices 142, the card payment network computing devices 808, the payment card bank computing devices 810, the employee bank computing devices 154, and/or a bank maintaining buyer accounts for electronic payments (not shown).

Figure 9:
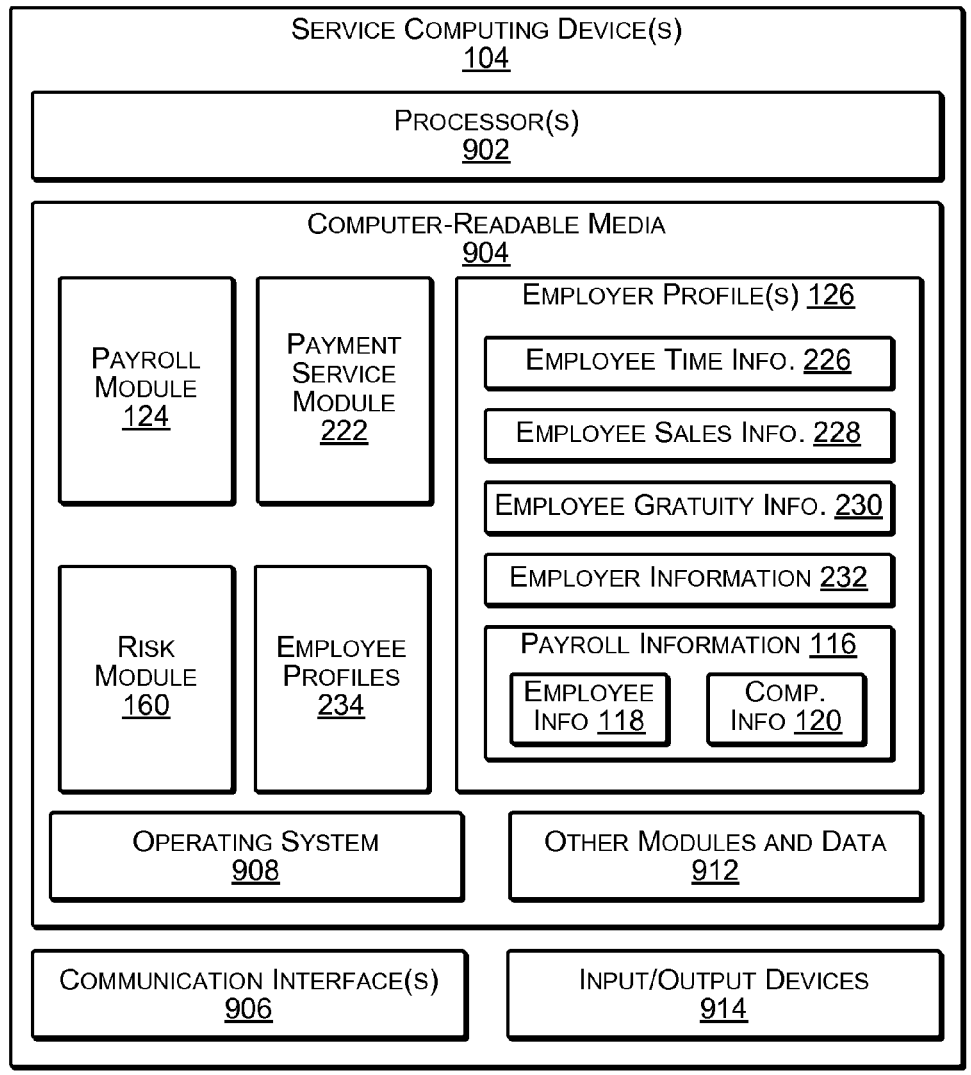
FIG. 9 illustrates select components of one or more example service computing devices according to some implementations.

FIG. 9 illustrates select components of the service computing device 104 that may be used to implement some functionality of the payroll service described herein. The service computing device 104 may be operated by a service provider that provides the payroll service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 104 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 104 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 104 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 104, the computer-readable media 904 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the service computing device 104. Functional components stored in the computer-readable media 904 may include the payroll module 124, the risk modules 160 and the payment service module 222. Additional functional components stored in the computer-readable media 904 may include an operating system 908 for controlling and managing various functions of the service computing device 104.

In addition, the computer-readable media 904 may store data used for performing the operations described herein. Thus, the computer-readable media may store the employer profiles 126, including the employee time information 226, employee sales information 228, employee gratuity information 230, employer information 232, employee profiles 234, and payroll information 116. In addition, the payroll information 116 may include the employee information 118 and compensation information 120. The service computing device 104 may also include or maintain other functional components and data, such as other modules and data 912, which may include programs, drivers, etc., and the data used or generated by the functional components. Further, the service computing device 104 may include many other logical, programmatic and physical components, of which those described above are merely examples that are related to the discussion herein.

The communication interface(s) 906 may include one or more interfaces and hardware components for enabling communication with various other devices, such as over the network(s) 106. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 104 may further be equipped with various input/output (I/O) devices 914. Such I/O devices 914 may include a display, various user interface controls (e.g., buttons, joystick, keyboard, mouse, touch screen, etc.), audio speakers, connection ports and so forth.

Figure 10:
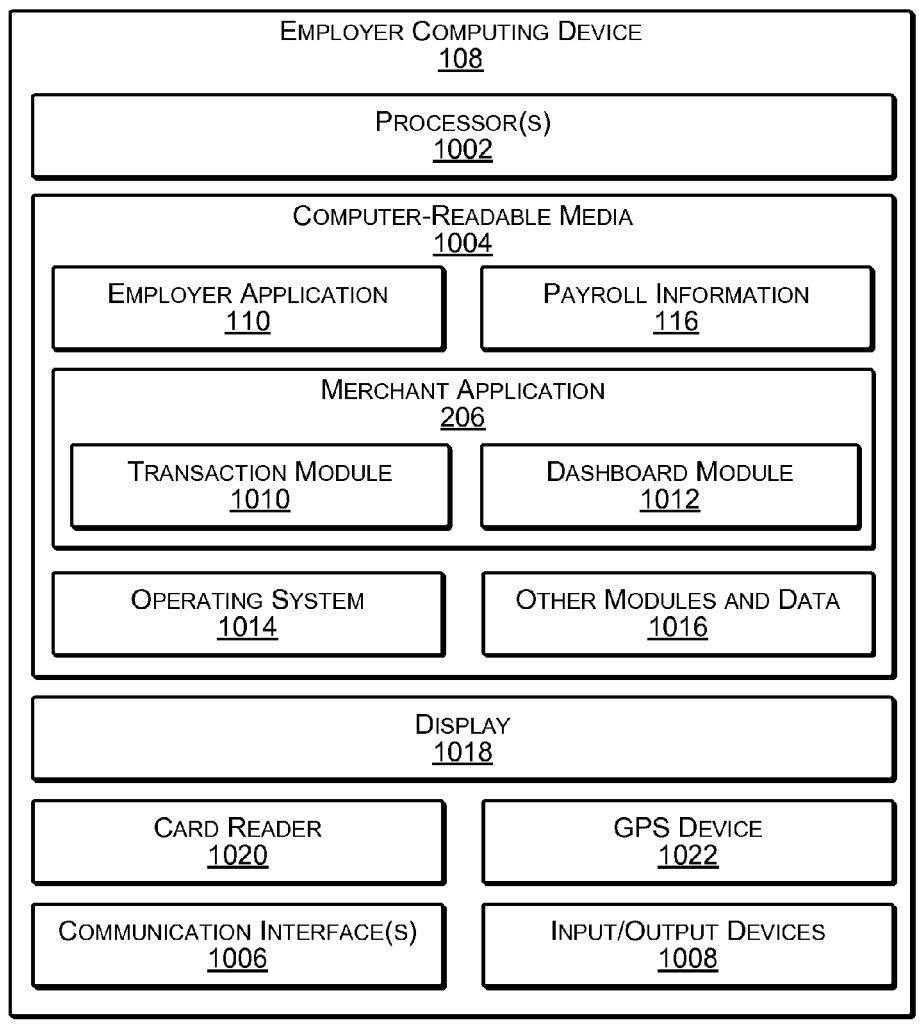
FIG. 10 illustrates select components of an example employer computing device according to some implementations.

FIG. 10 illustrates select example components of an example employer computing device 108, which in some examples may encompass the merchant device 202. The employer computing device 108 may be any suitable type of computing device, e.g., portable, semi-portable, semi-stationary, or stationary. Some examples of the employer computing device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the employer computing device 108 includes at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the employer computing device 108, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, the employer computing device 108 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the employer computing device 108. Functional components stored in the computer-readable media 1004 may include the employer application 110. In addition, in some examples, the employer computing device 108 may include the merchant application 206, which includes a transaction module 1010 and a dashboard module 1012. For example, the transaction module 1010 may present various user interfaces to enable the merchant/employer to conduct transactions, receive payments, and so forth. Further, the dashboard module 1012 may enable the merchant/employer to manage the merchant/employer account and the like. Additional functional components may include an operating system 1014 for controlling and managing various functions of the employer computing device 108 and for enabling basic user interactions.

In addition, the computer-readable media 1004 may also store data, data structures and the like, that are used by the functional components. For example, data stored by the computer-readable media 1004 may include payroll information 116 such as a list of employees on the payroll of the employer and other information about the employees, as well as compensation information.

Depending on the type of the employer computing device 108, the computer-readable media 1004 may also optionally include other functional components and data, such as other modules and data 1016, which may include programs, drivers, etc., and the data used or generated by the functional components. Further, the employer computing device 108 may include many other logical, programmatic and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the employer computing device 108 may include a display 1018. Depending on the type of computing device used as the employer computing device 108, the display 1018 may employ any suitable display technology. For example, the display 1018 may be a liquid crystal display, a plasma display, a light emitting diode display, an OLED (organic light-emitting diode) display, an electronic paper display, or any other suitable type of display able to present digital content thereon. In some examples, the display 1018 may have a touch sensor associated with the display 1018 to provide a touchscreen display configured to receive touch inputs for enabling interaction with a graphic interface presented on the display 1018. Accordingly, implementations herein are not limited to any particular display technology. Alternatively, in some examples, the employer computing device 108 may not include the display 1018, and information may be presented by other means, such as aurally.

The employer computing device 108 may further include the one or more I/O devices 1008. The I/O devices 1008 may include speakers, a microphone, a camera, and various user controls (e.g., buttons, a joystick, a keyboard, a keypad, etc.), a haptic output device, and so forth.

In addition, the employer computing device 108 may include or may be connectable to a payment card reader 1020. In some examples, the card reader 1020 may plug in to a port in the employer computing device 108, such as a microphone/headphone port, a data port, or other suitable port. The card reader 1020 may include a read head for reading a magnetic strip of a payment card, and further may include encryption technology for encrypting the information read from the magnetic strip. Alternatively, numerous other types of card readers may be employed with the employer computing device 108 herein, depending on the type and configuration of the employer computing device 108.

Other components included in the employer computing device 108 may include various types of sensors, which may include a GPS device 1022 able to indicate location information. Further, the merchant device may include one or more sensors 1024, such as an accelerometer, gyroscope, compass, proximity sensor, camera, microphone, and/or a switch, as discussed above. Additionally, the employer computing device 108 may include various other components that are not shown, examples of which include removable storage, a power source, such as a battery and power control unit, a barcode scanner, a printer, a cash drawer, and so forth. Further, the employee computing device and/or the buyer computing device may have a hardware configuration similar to the employer computing device, but may include different functional components, as discussed herein.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system associated with one or more servers of a payroll service provider, the one or more servers comprising:
   one or more processors; and
   one or more computer-readable media storing instructions executable by the one or more processors, wherein the instructions program the one or more processors to:
   receive, from one or more first computing devices operated by an employer, first payroll information for a first employee of the employer, wherein the first payroll information includes a first indication of compensation to be paid to the first employee, the one or more first computing devices each executing an instance of an employer application installed for configuring the one or more first computing devices to manage payroll on behalf of one or more employees via a payroll service offered by the payroll service provider;
   receive, from the one or more first computing devices, second payroll information for a second employee of the employer, wherein the second payroll information includes a second indication of compensation to be paid to the second employee;
   determine, based at least in part on the first payroll information, a first predicted amount of a first payroll payment to be paid to the first employee on behalf of the employer;
   determine, based at least in part on the second payroll information, a second predicted amount of a second payroll payment to be paid to the second employee on behalf of the employer;
   receive, from one or more second computing devices associated with merchants, transaction data of transactions performed between the merchants and customers, the one or more second computing devices each executing an instance of a merchant application installed for configuring the one or more second computing devices as point-of-sale (POS) terminals, the instances of the merchant application configuring the POS terminals to communicate the transaction data over a network to the system, a merchant of the merchants corresponding to the employer;
   determine, based at least in part on the transaction data, an indication of funds received by the employer;
   determine, based at least in part on the first predicted amount and the second predicted amount, a first portion of the funds to electronically transfer to a first account associated with the payroll service provider to use for payment, at least in part, of the first payroll payment and the second payroll payment, and a second portion of the funds to electronically transfer to a second account associated with the employer;
   access historic data associated with previous payroll payments of at least one other employer sharing at least one characteristic with the employer, the at least one other employer enrolled in the payroll service offered by the payroll service provider;
   determine, based at least in part on the historic data, an event corresponding to a change in amounts of payroll payments;
   predict an occurrence of the event at a particular future time;
   modify, based at least in part on predicting the occurrence of the event, the first portion of the funds by an amount to generate a modified first portion of the funds;
   send, to one or more third computing devices associated with a first employee bank, a first instruction to electronically transfer a first allocation of the modified first portion of the funds to a first employee bank account associated with the first employee to pay, at least in part, the first payroll payment; and
   send, to one or more fourth computing devices associated with a second employee bank, a second instruction to electronically transfer a second allocation of the modified first portion of the funds to a second employee bank account of the second employee to pay, at least in part, the second payroll payment.

2. The system as recited in claim 1, wherein:
   the first account is maintained by a bank associated with the payroll service provider; and
   the payroll service provider is authorized by the employer to withdraw funds from the first account.

3. The system as recited in claim 1, wherein the instructions program the one or more processors further to determine the first portion of the funds to electronically transfer to the first account and the second portion of the funds to electronically transfer to the second account daily.

4. The system as recited in claim 1, wherein the instructions program the one or more processors further to electronically transfer the first allocation to the first employee bank account and the second allocation to the second employee bank account via near real-time electronic transfers based at least in part on an interbank network that uses a single-message format.

5. A method comprising:
receiving, by a first computing device associated with a payroll service and from a second computing device operated by an employer, payroll information for an employee of the employer, wherein the payroll information includes an indication of compensation to be paid to the employee, the second computing device executing an instance of an employer application installed for configuring the second computing device to manage payroll on behalf of one or more employees via the payroll service;
determining, by the first computing device associated with the payroll service and based at least in part on the payroll information, a predicted amount of one or more payroll payments to be paid to at least the employee on behalf of the employer;
receiving, by the first computing device associated with the payroll service and from one or more point-of-sale (POS) devices associated with the employer, an indication of funds received by the one or more POS devices in association with one or more electronic payment transactions, the one or more POS devices executing one or more instances of a merchant application installed for configuring the one or more POS devices as POS terminals, the one or more instances of the merchant application configuring the POS terminals to communicate transaction data associated with the one or more electronic payment transactions over a network to the first computing device;
determining, by the first computing device associated with the payroll service and based at least in part on the predicted amount of the one or more payroll payments, a first portion of the funds to electronically transfer to a first account to use for payment, at least in part, of the one or more payroll payments, and a second portion of the funds to electronically transfer to a second account associated with the employer;
accessing, by the first computing device associated with the payroll service, historic data associated with a plurality of previous payroll payments of at least one other employer sharing at least one characteristic with the employer, the historic data indicating a likelihood of a change in the predicted amount, and the at least one other employer enrolled in the payroll service;
modifying, by the first computing device associated with the payroll service and based at least in part on the historic data, the first portion of the funds by an amount to generate a modified first portion of the funds;
causing, by the first computing device associated with the payroll service, the modified first portion of the funds to be electronically transferred to the first account associated with the payroll service for payment, at least in part, of the one or more payroll payments; and
causing, by the first computing device associated with the payroll service, the second portion of the funds to be electronically transferred to the second account associated with the employer.

6. The method as recited in claim 5, further comprising electronically transferring a third portion of stored funds from the first account to an employee account to pay, at least in part, a payroll payment of the one or more payroll payments, the payroll payment based at least in part on the indication of the compensation to be paid to the employee.

7. The method as recited in claim 5, further comprising using at least a third portion of stored funds from the first account to reimburse the payroll service for a previously paid payroll payment.

8. The method as recited in claim 5, further comprising:
determining that an amount of stored funds in the first account is insufficient to satisfy at least one payroll payment of the one or more payroll payments; and
determining a risk associated with proceeding with the at least one payroll payment.

9. The method as recited in claim 8, where the determining the risk comprises determining at least one of:
a financial position of the employer; or
a possibility of an incorrect payroll payment amount.

10. The method as recited in claim 8, wherein the determining the risk is based at least in part on the amount of stored funds in the first account.

11. The method as recited in claim 5, further comprising:
determining, based at least in part on the transaction data, an indication of at least one of time worked by the employee on a particular day, sales attributed to the employee on the particular day, or gratuities received by the employee on the particular day;
determining, based at least in part on the payroll information and the at least one of the time, the sales, or the gratuities, a payment amount of a payroll payment of the one or more payroll payments, the payroll payment corresponding to the employee; and
based at least in part on an amount of stored funds in the first account, sending an instruction to cause the payment amount of the payroll payment to be electronically transferred to an employee account associated with the employee.

12. One or more non-transitory computer-readable media maintaining instructions stored thereon that, when executed by one or more processors, cause the one or more processors to:
receive, by a computing device associated with a payroll service, from one or more point-of-sale (POS) devices associated with an employer, an indication of funds received by the one or more POS devices made in association with one or more electronic payment transactions, the one or more POS devices executing one or more instances of a merchant application installed for configuring the one or more POS devices as POS terminals, the one or more instances of the merchant application configuring the POS terminals to communicate transaction data associated with the one or more electronic payment transactions over a network to the computing device associated with the payroll service;
determine, by the computing device associated with the payroll service, a first portion of the funds and a second portion of the funds, the first portion of the funds corresponding to a predicted amount of one or more payroll payments to be paid on behalf of the employer;
retrieve, by the computing device associated with the payroll service, historical data associated with at least one other employer sharing at least one characteristic with the employer, the historical data indicating a likelihood of a change to the predicted amount and the at least one other employer enrolled in the payroll service;
modify, by the computing device associated with the payroll service and based at least in part on the historical data, the first portion of the funds by an amount to determine a modified first portion of the funds;

modify, by the computing device associated with the payroll service and based on the modified first portion of the funds, the second portion of funds to determine a modified second portion of the funds;

send a first instruction to cause the modified first portion of the funds to be electronically transferred to a first account associated with the payroll service for payment, at least in part, of the one or more payroll payments on behalf of the employer;

send a second instruction to cause the modified second portion of the funds to be electronically transferred to a second account associated with the employer; and based at least in part on an amount of stored funds in the first account, send a third instruction to cause a payroll payment on behalf of the employer to be electronically transferred to an employee account associated with an employee.

13. The one or more non-transitory computer-readable media as recited in claim 12, wherein the instructions further cause the one or more processors to:

receive, from one or more employer computing devices, compensation information indicating compensation to be paid to one or more employees of the employer, the one or more employer computing devices executing one or more instances of an employer application installed for configuring the one or more employer computing devices to manage payroll on behalf of the one or more employees via the payroll service; and based at least in part on the compensation information, determine the predicted amount of the one or more payroll payments.

14. The one or more non-transitory computer-readable media as recited in claim 13, wherein the at least one characteristic comprises a geographic region or a merchant category.

15. The one or more non-transitory computer-readable media as recited in claim 12, wherein the instructions further cause the one or more processors to:

compare the amount of stored funds in the first account with a total amount of the one or more payroll payments to be paid on behalf of the employer; and based at least in part on comparing the amount of stored funds in the first account with the total amount of the one or more payroll payments, determine that a risk associated with proceeding with payment of the one or more payroll payments is within a threshold level.

16. The one or more non-transitory computer-readable media as recited in claim 12, wherein the instructions further cause the one or more processors to send the third instruction to cause the payroll payment to be electronically transferred to the employee account as a near real-time fund transfer via an interbank network that uses a single-message format for transferring the funds.

17. The one or more non-transitory computer-readable media as recited in claim 12, wherein the instructions further cause the one or more processors to send the third instruction to cause the payroll payment to be electronically transferred to the employee account as a near real-time fund transfer based at least in part on debit card information associated with the account of the employee.

18. The one or more non-transitory computer-readable media as recited in claim 12, wherein the instructions further cause the one or more processors to:

determine, based at least in part on the transaction data, an indication of at least one of time worked by the employee on a particular day, sales attributed to the employee on the particular day, or gratuities received by the employee on the particular day; and determine, based at least in part on employee compensation information and the at least one of the time, the sales, or the gratuities, a payment amount of the payroll payment.

19. The one or more non-transitory computer-readable media as recited in claim 18, wherein the instructions further cause the one or more processors to send the third instruction to cause the payroll payment to be electronically transferred on the particular day.

20. The one or more non-transitory computer-readable media as recited in claim 18, wherein the instructions further cause the one or more processors to determine the at least one of the time, the sales, or the gratuities based at least in part on the transaction data received from the one or more POS devices.

* * * * *